United States Patent
Muddiman et al.

(10) Patent No.: US 10,567,854 B1
(45) Date of Patent: Feb. 18, 2020

(54) REDUNDANT SENSOR SYSTEM WITH FAULT DETECTION AND MITIGATION

(71) Applicant: NXP USA, Inc., Austin, TX (US)

(72) Inventors: Matthew Wayne Muddiman, Gilbert, AZ (US); Russell Joseph Lynch, West Bloomfield, MI (US); Michael Collins, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/205,326

(22) Filed: Nov. 30, 2018

(51) Int. Cl.
*H02H 3/00* (2006.01)
*H04Q 9/02* (2006.01)

(52) U.S. Cl.
CPC ..... *H04Q 9/02* (2013.01); *H04Q 2213/13034* (2013.01); *H04Q 2213/13162* (2013.01); *H04Q 2213/13167* (2013.01)

(58) Field of Classification Search
None
See application file for complete search history.

(56) References Cited

U.S. PATENT DOCUMENTS

| | | | |
|---|---|---|---|
| 4,280,188 A | 7/1981 | Weinstein et al. | |
| 6,462,530 B1 | 10/2002 | Layton | |
| 7,237,169 B2 | 6/2007 | Smith | |
| 8,677,822 B2 | 3/2014 | Sato | |
| 9,642,568 B2 | 5/2017 | Shah et al. | |
| 9,983,032 B1 | 5/2018 | Kraver et al. | |
| 2010/0123987 A1* | 5/2010 | Pietrzyk | H01H 47/002 361/78 |
| 2017/0322098 A1 | 11/2017 | Dawson et al. | |

* cited by examiner

*Primary Examiner* — John F Mortell
(74) *Attorney, Agent, or Firm* — Charlene R. Jacobsen

(57) ABSTRACT

A system includes first and second modules, each having a sensor and a processing circuit. First and second fault detection circuits are coupled with respective first and second modules. Each of the first and second fault detection circuits determines from a processed signal output from a corresponding module whether the module is faulted, prevents output of the processed signal when the module is faulted, and enables output of the processed signal when the module is not faulted. A signal processing unit combines the processed signals from the first and second modules to produce a first output signal when neither of the first and second modules is faulted, and the signal processing unit produces a second output signal by utilizing only the processed signal from a non-faulted one of the first and second modules when the other of the first and second modules is faulted.

14 Claims, 10 Drawing Sheets

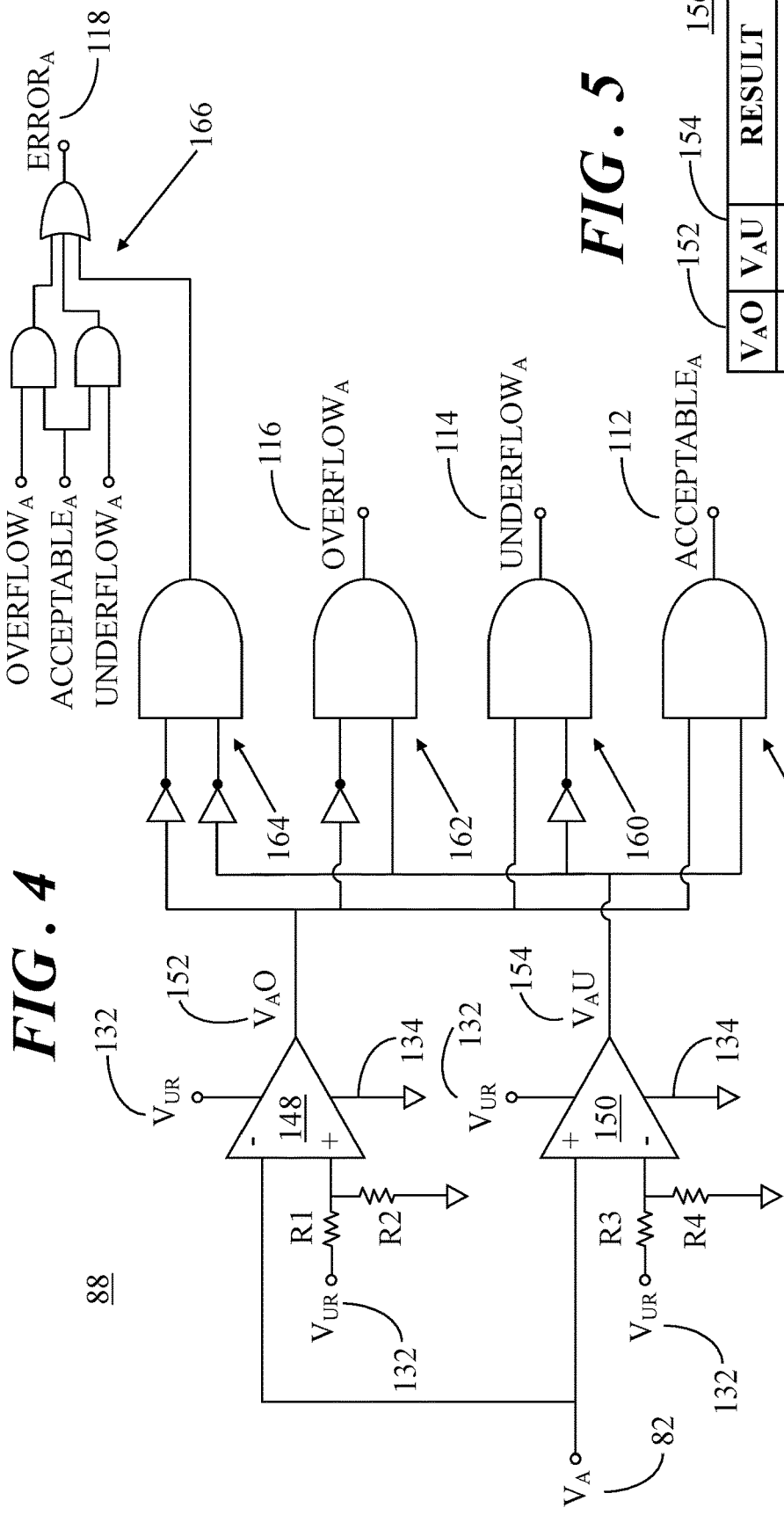

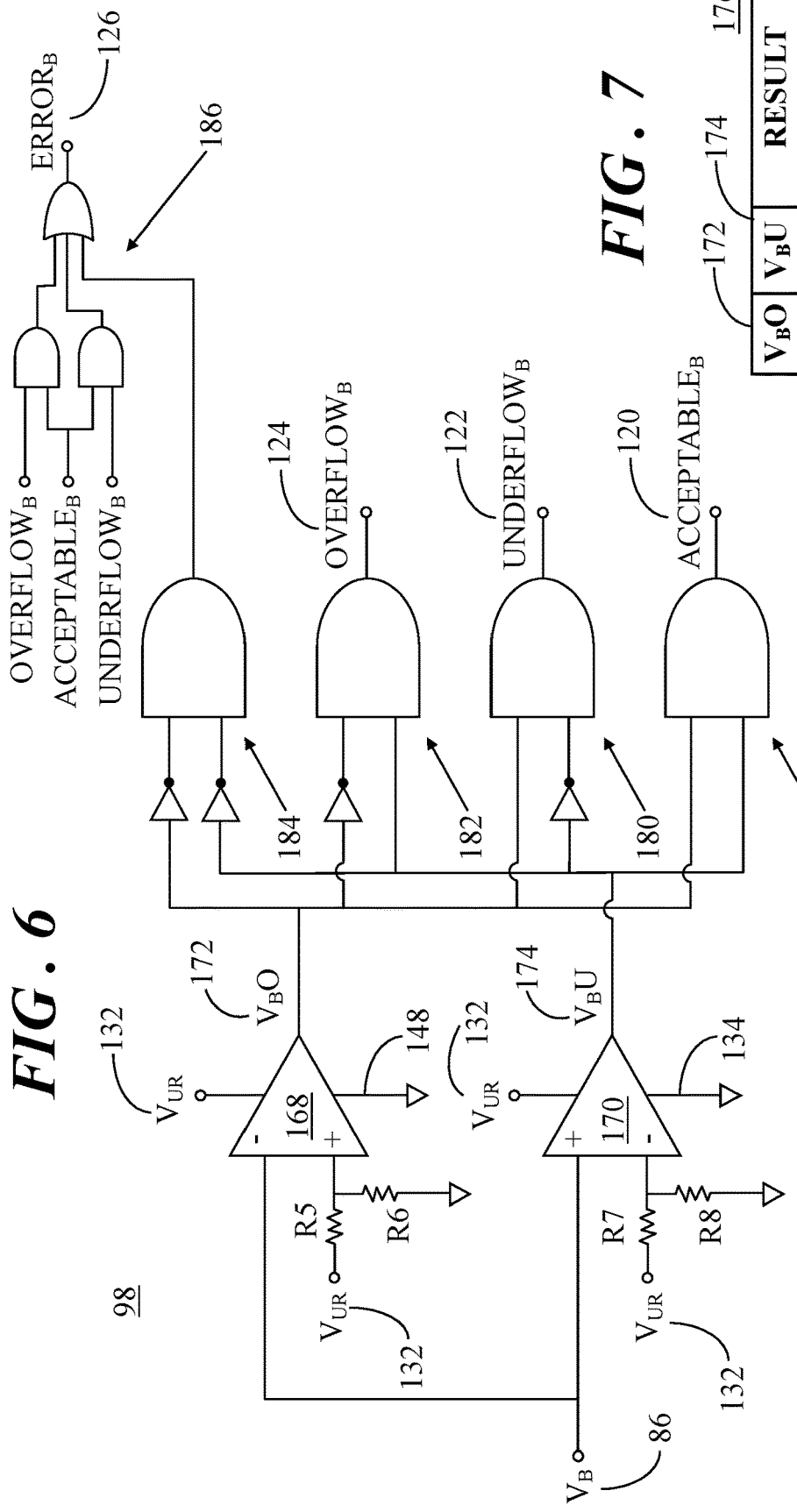

REDUNDANT SENSOR SYSTEM WITH FAULT DETECTION AND MITIGATION

TECHNICAL FIELD OF THE INVENTION

The present invention relates generally to sensors. More specifically, the present invention relates to a redundant sensor system with fault detection and mitigation of a fault within the redundant sensor system.

BACKGROUND OF THE INVENTION

Sensor systems are widely used in applications such as automotive, inertial guidance systems, household appliances, game devices, protection systems for a variety of devices, and many other industrial, scientific, and engineering systems. In applications where safety is critical, redundancy is sometimes employed for enhanced sensitivity and greater reliability. Such applications can contain redundant sensors capable of measuring the same physical stimulus, and in some cases (e.g., inertial sensors, magnetic sensors, and so forth), along the same sensitive (e.g., input axis).

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 4 shows a block diagram of a first fault detection circuit of the measuring circuit of FIG. 2;

FIG. 5 shows a table of possible outcomes from the first fault detection circuit;

FIG. 6 shows a block diagram of a second fault detection circuit of the measuring circuit of FIG. 2;

FIG. 7 shows a table of possible outcomes from the second fault detection circuit;

DETAILED DESCRIPTION

Figure 1:
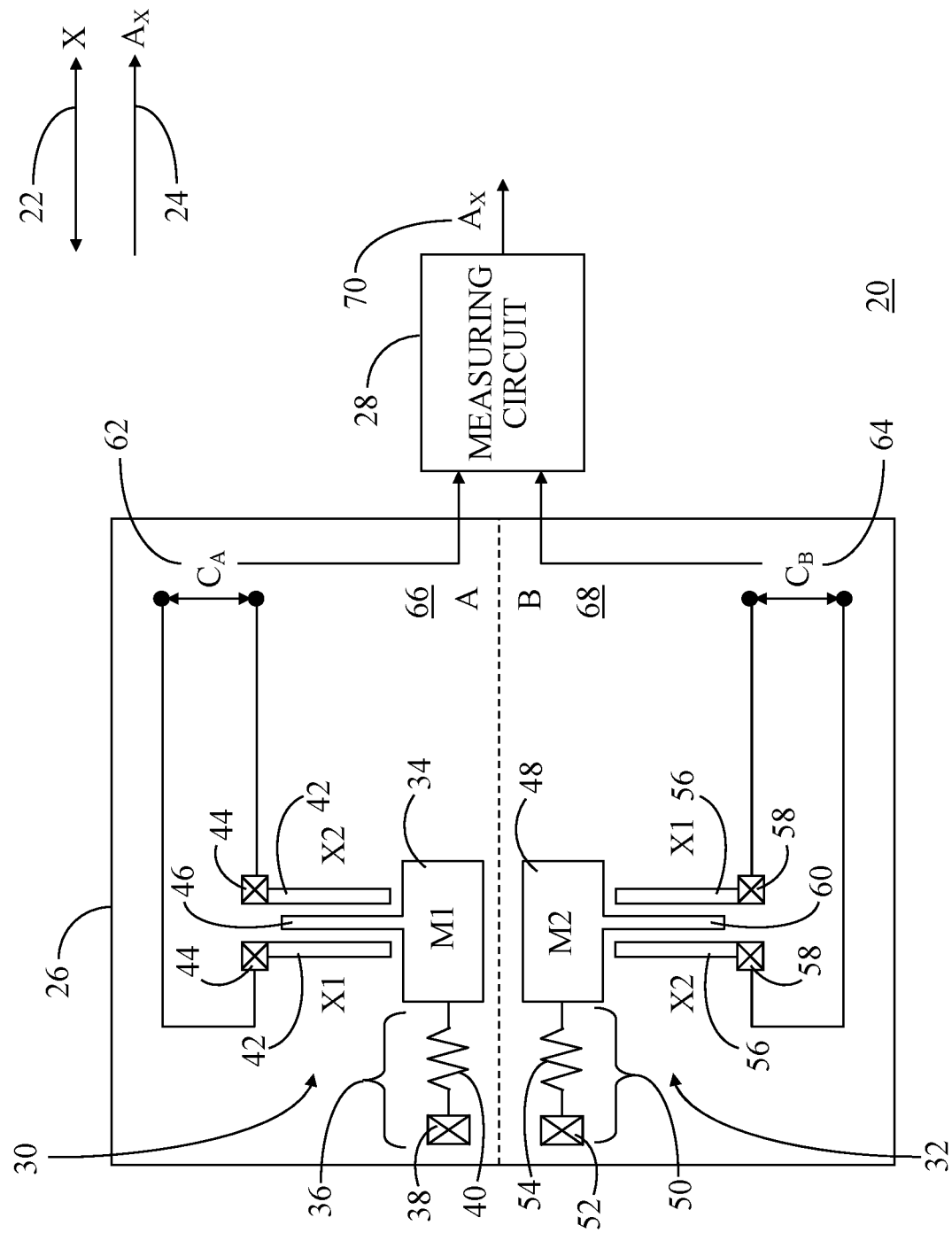
FIG. 1 shows in a simplified and representative form, a block diagram of a sensor system.

In overview, the present disclosure concerns redundant sensor systems and methodology for fault detection and mitigation of faults within the redundant sensor systems. More particularly, a sensor system having redundant modules (each module including a sensor and a front-end signal processing chain) includes an independent fault detection circuit associated with each module. Each fault detection circuit is configured to determine whether the corresponding module is faulted or non-faulted. The fault detection circuit prevents output of signals from the module when the module is faulted and enables output of signals from the module when the module is non-faulted. In the instance of a single point failure, the system and methodology can enable a reduced functionality mode of the sensor system. The fault detection methodology may function autonomously to detect a fault at one of the modules and mitigate it dynamically to isolate the faulted module and produce a processed digital output signal indicative of the output from the non-faulted module. Thus, the methodology may be implemented in a variety of redundant sensor systems in which the functionality of a redundant sensor system may be determined, and fault mitigation may be performed.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Much of the inventive functionality and many of the inventive principles are best implemented with or in integrated circuits (ICs) including possibly application specific ICs or ICs with integrated processing or control or other structures. It is expected that one of ordinary skill, notwithstanding possibly significant effort and many design choices motivated by, for example, available time, current technology, and economic considerations, when guided by the concepts and principles disclosed herein will be readily capable of generating such ICs and structures with minimal experimentation. Therefore, in the interest of brevity and minimization of any risk of obscuring the principles and concepts according to the present invention, further discussion of such structures and ICs, if any, will be limited to the essentials with respect to the principles and concepts of the various embodiments.

Referring to FIG. 1, FIG. 1 shows in a simplified and representative form, a block diagram of a sensor system 20. For ease of explanation, sensor system 20 is adapted to sense a physical stimulus in an X-direction 22. This physical stimulus may be linear acceleration, labeled $A_X$ and represented by an arrow 24, parallel to a major planar surface of the device. As such, sensor system 20 may alternatively be referred to herein as accelerometer 20. Accelerometer 20 includes a sensor device 26 and electronic circuitry, referred to herein as a measuring circuit 28, that is electrically coupled to sensor device 26.

Sensor device 26 includes a first sensor 30 and a second sensor 32. In the illustrated example, first sensor 30 includes a first movable element 34, suspended above an underlying substrate (not shown) by one or more suspension systems 36 (one schematically shown). Each of suspension systems 36 includes a suspension anchor 38 formed on the substrate and a spring structure 40 interconnecting first movable element 34 with a corresponding suspension anchor 38. Pairs of fixed fingers 42 (one pair shown) are attached to the substrate by fixed finger anchors 44. Sense fingers 46 (one shown) extending from first movable element 34 are positioned adjacent to fixed fingers 42. Sense gaps are thus formed between sense fingers 46 and fixed fingers 42.

Likewise, second MEMS structure 32 includes a second movable element 48, suspended above the underlying substrate by one or more suspension systems 50 (one schematically shown). Each of suspension systems 50 includes a suspension anchor 52 formed on the substrate and a spring structure 54 interconnecting second movable element 48 with a corresponding suspension anchor 52. Pairs of fixed fingers 56 (one pair shown) are attached to the substrate by fixed finger anchors 58. Sense fingers 60 (one shown) extending from second movable element 48 are positioned adjacent to fixed fingers 56. Sense gaps are thus formed between sense fingers 60 and fixed fingers 56.

In some embodiments, first and second sensors 30, 32 are generally identical. That is, spring structures 40, 54 have the same configuration and spring constant (within process constraints) and first and second movable elements 34, 48 have the same size, shape, and mass (within process constraints). Accordingly, both of first and second movable elements 34, 48 will behave similarly under the effect of the same physical stimulus (e.g., acceleration 24). The output signals from each of first and second sensors 30, 32 can therefore be combined to obtain a measurement signal indicative of the sensed physical stimulus. Thus, accelerometer 20 may be considered a redundant sensor system. Redundant sensor configurations are increasingly being leveraged to achieve increased accuracy over a single sensor configuration and to enhance the failure tolerance of the sensor system.

In the illustrated example, each of first and second movable elements 34, 48 is configured to move in response to acceleration 24 in X-direction 22. When first movable element 34 moves in response to acceleration 24 in X-direction 22, capacitances between the moving sense fingers 46 and the fixed fingers 42 change to produce a first sense signal 62, labeled $C_A$. Likewise, when second movable element 48 moves in response to acceleration 24 in X-direction 22, capacitances between the moving sense fingers 60 and the fixed fingers 56 change to produce a second sense signal 64, labeled $C_B$. Since measuring circuit 28 is electrically coupled to first and second sensors 30, 32, measuring circuit 28 is thus configured to receive first and second sense signals 62, 64.

As discussed above, first and second sensors 30, 32 are independent from one another and act as two independent sensor channels. These independent sensor channels are referred to herein as a first channel 66 (e.g., A) and a second channel 68 (e.g., B). Further, they measure the same physical stimulus, e.g., acceleration 24 in X-direction 22. Thus, first and second sense signals 62, 64 are generated independent from one another, but are indicative of the same physical stimulus. First sense signal 62, $C_A$, from first channel 66 may be represented by expression (1) and second sense signal 64, $C_B$, from second channel 68 may be represented by expression (2), as follows:

$$A: C_A \propto C(M1,X1) - C(M1,X2) \quad (1)$$

$$B: C_B \propto C(M2,X1) - C(M2,X2) \quad (2)$$

Expression (1) indicates that first sense signal 62, $C_A$, provided by first channel 66, A, is proportional to a difference of the capacitance, C, between sense fingers 46 of first movable element 34, M1, and first fixed fingers, X1, of each pair of fixed fingers 42 and the capacitance, C, between sense fingers 46 of first movable element 34, M1, and second fixed fingers, X2, of each pair of fixed fingers 42. Expression (2) indicates that second sense signal 64, $C_B$, provided by second channel 68, B, is proportional to a difference of the capacitance, C, between sense fingers 60 of second movable element 48, M2, and first fixed fingers, X1, of each pair of fixed fingers 56 and the capacitance, C, between sense fingers 60 of second movable element 48, M2, and second fixed fingers, X2, of each pair of fixed fingers 56. The values of the independent first and second channels 66, 68 may be summed, or otherwise combined, to obtain an output reading "R" of a fully differential accelerometer, as follows:

$$R \propto A: C_A - B: C_B \quad (3)$$

Expression (3) can be expanded as follows:

$$R \propto [C(M1,X1) + C(M2,X2)] - [C(M1,X2) + C(M2,X1)] \quad (4)$$

Measuring circuit 28 generally includes a signal chain that functions to process first and second sense signals 62, 66 from the independent first and second channels 66, 68 to produce a processed output signal 70, labeled $A_X$. In accordance with embodiments discussed below, measuring circuit 28 is configured to assess the functionality of first and second sensors 30, 32 and front-end processing circuitry associated with each sensor 30, 32 and detect faults within sensor system 20, if present, by independently evaluating processed signals indicative of first and second sense signals 62, 64.

For simplicity of description, a single axis accelerometer having redundant identical sensors is shown. In practice, however, the sensor device may be a two or three axis sensing device, in which each axis may have redundant channels. Further, first and second sensors 30, 32 are capacitive transducers configured to sense linear acceleration. However, it should be understood that first and second sensors 30, 32 may be any of a variety of transducers which may be independently configured to sense the desired physical stimulus (e.g., acceleration, angular velocity, pressure, and so forth). Moreover, first and second sensors 30, 32 may be different transducer structures with different sensing architectures that are both configured to sense the same physical stimulus (e.g., one sensor may be a capacitive sensor, as shown, while the other sensor may be a piezo resistive bridge circuit). Still further, although configurations are described herein in which the redundant system includes only two sensors, it should be understood that a redundant system may include more than two sensors configured to sense the same physical stimulus along the same sense axis.

Figure 2:
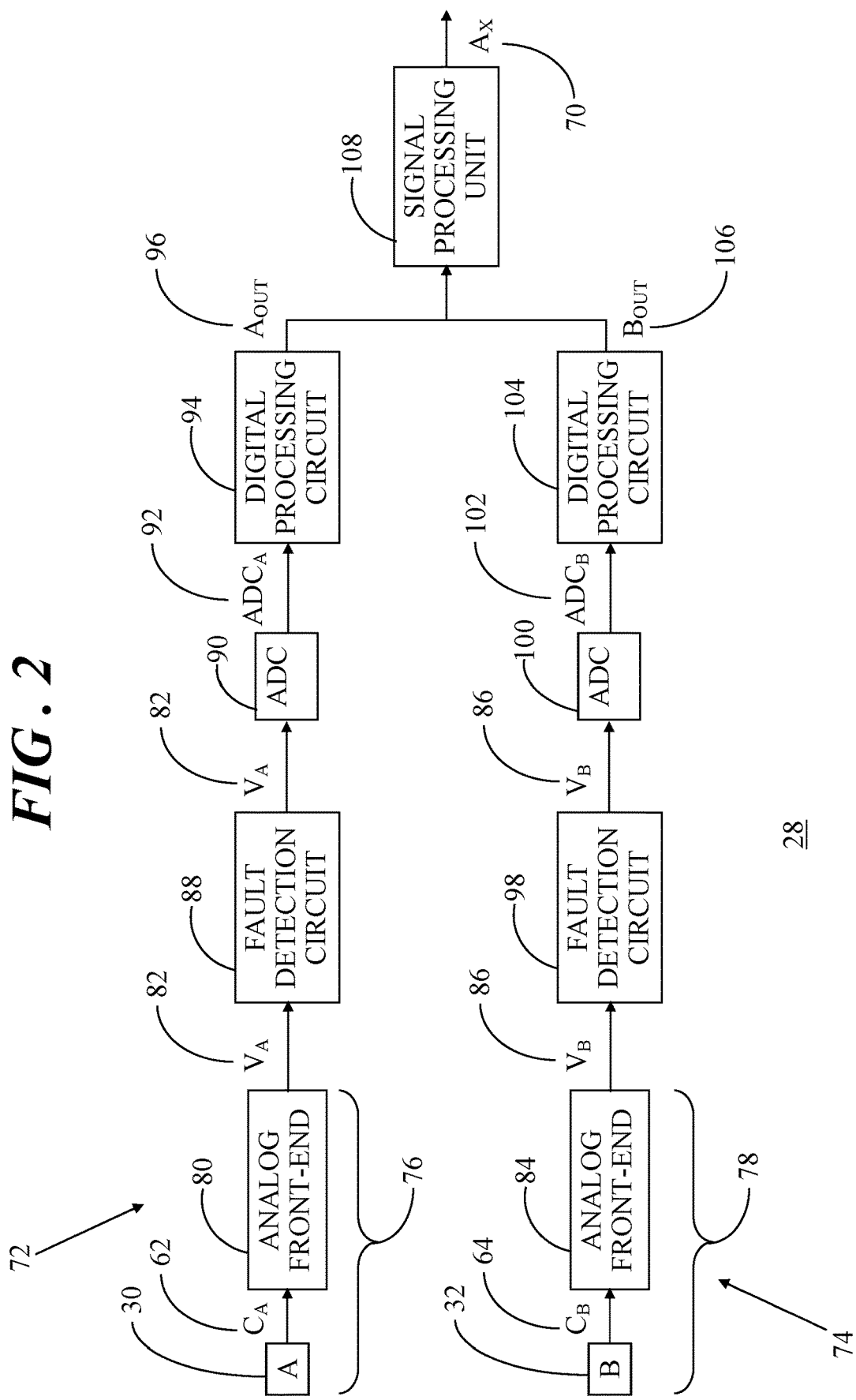
FIG. 2 shows a block diagram of a measuring circuit of the sensor system of FIG. 1.

FIG. 2 shows a block diagram of measuring circuit 28 of sensor system 20 (FIG. 1). Measuring circuit 28 includes two independent signal processing chains. A first signal processing chain 72 is configured to process first sense signal 62 output from first sensor 30 and a second signal processing chain 74 is configured to process second sense signal 64 output from second sensor 32.

In general, system 20 (FIG. 1) includes a first module 76 of first signal processing chain 72 and a second module 78 of second signal processing chain 74. First module 76 includes first sensor 30 (which is configured to produce first sense signal 62 in response to acceleration 24, FIG. 1) and a first processing circuit, referred to herein as a first analog front-end circuit 80. First analog front-end circuit 80 is configured to receive first sense signal 62 and produce a first analog data stream, referred to herein as a first processed signal 82, $V_A$, representative of first sense signal 62. Similarly, second module 78 includes second sensor 32 (which is configured to produce second sense signal 64 in response to acceleration 24, FIG. 1) and a second processing circuit, referred to herein as a second analog front-end circuit 84. Second analog front-end circuit 84 is configured to receive second sense signal 64 and produce a second analog data stream, referred to herein as a second processed signal 86, $V_B$, representative of second sense signal 64.

In some embodiments, first and second analog front-end circuits 80, 84 include duplicate circuitry configured in accordance with a particular architecture. For example, each of first and second analog front-end circuits 80, 84 may include a capacitance-to-voltage converter stage having an input connected to a corresponding one of first and second sensors 30, 32 for receiving one of first and second sense signals 62, 64 and converting them to one or more voltage output signals. However, for embodiments in which the sensors have differing sensing architectures (e.g., one is a capacitive transducer and another is a piezo resistive transducer), first and second analog front-end circuits 80, 84 may not include duplicate circuitry. Additional stages of first and second analog front-end circuits 80, 84 may include an anti-aliasing filter stage, a pre-filter stage, a chopper circuit stage, a gain stage, and so forth in accordance with the particular processing architecture such that first analog front-end circuit 80 produces first processed signal 82 representative of first sense signal 62 and second analog front-end circuit 80 produces second processed signal 86 representative of second sense signal 62. In this example, each of first and second processed signals 82, 86 may therefore be analog voltage signals.

With reference to first signal processing chain 72, a first fault detection circuit 88 has an input electrically coupled with an output of first analog front-end circuit 80. First fault detection circuit 88 has an output that is selectively coupled (discussed below) to an input of a first analog-to-digital converter (ADC) 90. First ADC 90 is configured to receive first processed signal 82 and convert first processed signal 82 into a first digital data stream 92, $ADC_A$, indicative of first sense signal 62. An output of first ADC 90 may be coupled to an input of a first digital processing circuit 94. First digital processing circuit 94 may further process first digital data stream 92 (as discussed in connection with FIG. 9) to produce a first processed digital output signal 96, $A_{OUT}$, from first signal processing chain 72.

Now with reference to second signal processing chain 74, a second fault detection circuit 98 has an input electrically coupled with an output of second analog front-end circuit 84. Second fault detection circuit 98 has an output that is selectively coupled (discussed below) to an input of a second analog-to-digital converter (ADC) 100. Second ADC 100 is configured to receive second processed signal 86 and convert second processed signal 86 into a second digital data stream 102, $ADC_B$, indicative of second sense signal 64. An output of second ADC 100 may be coupled to an input of a second digital processing circuit 104. Second digital processing circuit 104 may further process second digital data stream 102 (as discussed in connection with FIG. 9) to produce a processed digital output signal 106, $B_{OUT}$, from second signal processing chain 74.

As will be discussed in greater detail below, first fault detection circuit 88 is configured to determine from first processed signal 82 whether first module 76 is faulted. First fault detection circuit 88 is further configured to prevent output of first processed signal 82 when first module 76 is faulted and enable output of first processed signal 82 when first module 76 is not faulted. Likewise, second fault detection circuit 98 is configured to determine from second processed signal 86 whether second module 78 is faulted. Second fault detection circuit 98 is further configured to prevent output of second processed signal 86 when second module 78 is faulted and enable output of second processed signal 86 when second module 78 is not faulted. The term "faulted" utilized in connection with either of first and second modules 76, 78 refers to a condition in which the module is at least temporarily not operating nominally. For example, the corresponding processed signal (first or second processed signal 82, 86) may be outside of its pre-defined measurable range which may result in a temporary condition, e.g., a temporary fault. Alternatively, the module may have a critical error thus resulting in a permanent condition, e.g. a critical fault, such that the module is defective.

A signal processing unit 108 is electrically coupled to each of first and second fault detection circuits 88, 98 via respective first and second signal processing chains 72, 74. Again, as will be discussed in greater detail below, signal processing unit 108 is configured to produce a first output signal when both of first and second processed signals 82, 86 (in the form of first and second processed digital output signals 96, 106) are received, the first output signal being a combination of first and second processed signals 82, 86. Signal processing unit 108 is further configured to produce a second output signal when only one of first and second processed signals 82, 86 is received, the second output signal utilizing first processed signal 82 or second processed signal 86 from a non-faulted one of first and second modules 76, 78. Hence, processed output signal 70 may be a function of a combination of first and second processed signals 82, 86 when neither of first and second modules 76, 78 is faulted. Or processed output signal 70 may be a function of only one of first and second processed signals 82, 86 in the instance that only one of first and second modules 76, 78 is faulted. Still further, processed output signal 70 may not be produced at all in the instance of a critical failure of sensor system 20 (FIG. 1). Thus, in some embodiments, if one of first and second modules 76, 78 is determined to be faulted, the faulted one of first and second modules 76, 78 is isolated from the remainder of the system and processed output signal 70 can be produced using only the output signals from the non-faulted one of first and second modules 76, 78.

Figure 3:
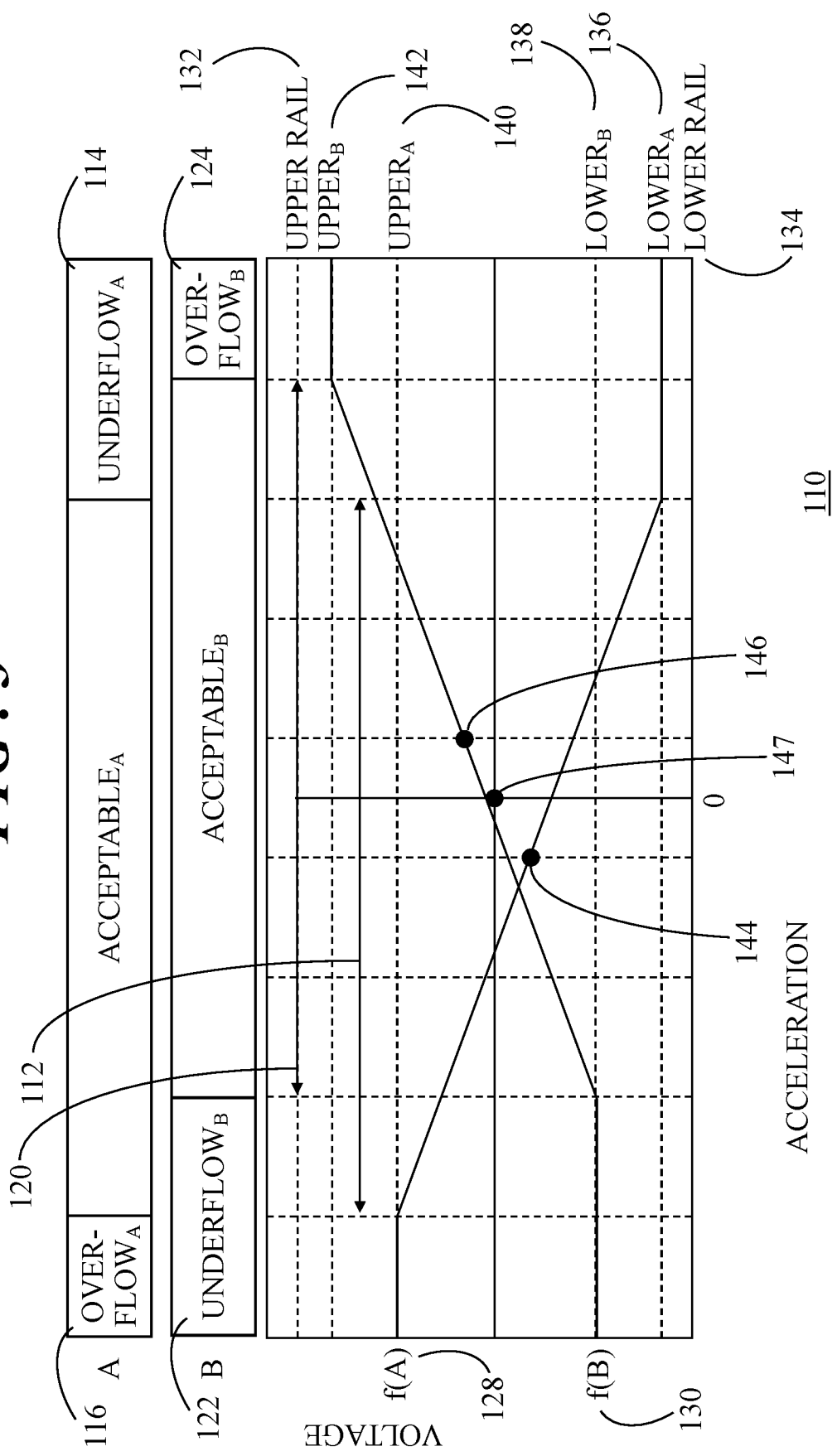
FIG. 3 shows a graph representing possible states related to the operational status of first and second sensor modules of the sensor system of FIG. 1.

FIG. 3 shows a graph 110 representing possible states related to the operational status of first and second sensor modules 30, 32 (FIG. 1). In general, first fault detection circuit 88 (FIG. 2) is configured to identify one of a plurality of possible states of first module 76 in response to first processed signal 82. The plurality of possible states includes a non-faulted state, referred to as an acceptable state 112 ($ACCEPTABLE_A$), an underflow state 114 ($UNDERFLOW_A$), an overflow state 116 ($OVERFLOW_A$), and an error state 118 ($ERROR_A$ represented in FIG. 4). Likewise, second fault detection circuit 98 (FIG. 2) is configured to identify one of a plurality of possible states of second module 78 in response to second processed signal 86. The plurality of possible states includes a non-faulted state, referred to as an acceptable state 120 (ACCEPTABLE$_B$), an underflow state 122 (UNDERFLOW$_B$), and an overflow state 124 (OVERFLOW$_B$), and an error state 126 (ERROR$_B$ represented in FIG. 6).

Graph 110 further shows a first transfer function 128, f(A), representing possible values of first processed signal 82 from first module 30 and a second transfer function 130, f(B), representing possible values of second processed signal 86 from second module 32. In this example, first transfer function 128 represents the output of first module 30 (e.g., voltage) for each possible input (e.g., acceleration) and second transfer function 130 represents the output of second module 32 (e.g., voltage) for each possible input (e.g., acceleration). First and second transfer functions 128, 130 are limited by the supply voltage to measuring circuit 28 (FIG. 2). Thus, a positive supply voltage 132 (UPPER RAIL) and a negative supply voltage 134 (LOWER RAIL) set the range limit for first and second transfer functions 128, 130.

Acceptable states 112, 120 represent a nominal or measurable range of values (e.g., voltage values relative to acceleration values) for first and second transfer functions 128, 130. Underflow states 114, 122 and overflow states 116, 124 represent a set of thresholds near each range limit (the vertical, voltage value) and near each data limit (the horizontal axis, acceleration value) for each of first and second modules 76, 78 (FIG. 2), such that values between the range/data thresholds and the range/data limits are forced to the value of the threshold. Underflow states 114, 122 correspond to a lower threshold limit near the lower range and data limits and overflow states 116, 124 correspond to an upper threshold limit near the upper range and data limits. Accordingly, a first lower threshold limit 136 (LOWER$_A$) may be defined to identify underflow state 114 (UNDERFLOW$_A$), a second lower threshold limit 138 (LOWER$_B$) may be defined to identify underflow state 122 (UNDERFLOW$_B$), a first upper threshold limit 140 (UPPER$_A$) may be defined to identify overflow state 116 (OVERFLOW$_A$), and a second upper threshold limit 142 (UPPER$_B$) may be defined to identify overflow state 124 (OVERFLOW$_B$). Thus, the underflow and overflow states are outside of the pre-defined measurable range.

In some embodiments, first lower threshold limit 136 is not the same as second lower threshold limit 138. Additionally, first upper threshold limit 140 is not the same as second upper threshold limit 142. For example, first upper threshold limit 140 may be 85% of positive supply voltage 132 and first lower threshold limit 136 may be 5% of positive supply voltage 132. Conversely, second upper threshold limit 142 may be 95% of positive supply voltage 132 and second lower threshold limit 138 may be 15% of positive supply voltage 132. By setting differing threshold limits, it may be possible to detect situations in which values may be temporarily too high (indicating an overflow state) or temporarily too low (indicating an underflow state) but might recover. In either such condition, the mechanism will allow sensor system 20 (FIG. 1) to revert to the other signal (if it is within an acceptable state) and continue operating until a recovery.

As part of factory calibration, each of first and second sensors 30, 32 (FIG. 1) may be assigned a unique set of coefficients. For example, first sensor 30 may be assigned a "Sensitivity-A" and an "Offset-A" and second sensor 32 may be assigned a "Sensitivity-B" and an "Offset-B." In some designs, first sensor 30 may be defined by negative polarities of both Sensitivity-A and Offset-A, and second sensor 32 may be defined by positive polarities of both Sensitivity-B and Offset-B. Further, by design, the absolute values of Sensitivity-A and Sensitivity-B may not be equal. Likewise, the absolute values of Offset-A and Offset-B may not be equal.

The purposely different settings of sensitivity, offset, and upper and lower thresholds force the midpoints 144, 146 of the two sensor signal chains (e.g., first and second transfer functions 128, 130) away from one another and away from a center point 147 of the usable data limit (horizontal axis) and range limit (vertical axis). Such a configuration may enable detection of a common signal chain "stuck-at 50%" fault that may occur in some systems.

FIG. 4 shows a block diagram of first fault detection circuit 88 of measuring circuit 28 (FIG. 2). First fault detection circuit 88 includes a first comparator 148 and a second comparator 150. Each of first and second comparators 148, 150 may be powered by positive supply voltage 132 and negative supply voltage 134. In this example, negative supply voltage 134 is ground. However, in other embodiments, negative supply voltage 134 may be an actual negative value. First processed signal 82 is input to a negative terminal of first comparator 148. Positive supply voltage 132, adjusted by resistors R1 and R2 to yield first upper threshold limit 140 (FIG. 3), is input to a positive terminal of first comparator 148. First comparator 148 is configured to output a digital value in accordance with the following expressions:

$$V_A O = 0 \text{ if } V_A > \left[\frac{V_{UR}}{(R1 + R2)}\right] R2, \text{ or} \quad (5)$$

$$V_A O = 1 \text{ if } V_A < \left[\frac{V_{UR}}{(R1 + R2)}\right] R2 \quad (6)$$

Thus, first comparator 148 is configured to compare first processed signal 82 with first upper threshold limit 140, produce a first digital value (e.g., 1) as an overflow value 152, $V_A O$, at an output terminal of first comparator 148 when first processed signal 82 is less than first upper threshold limit 140, or produce a second digital value (e.g., 0) as overflow value 152 when first processed signal 82 is greater than first upper threshold limit 140. As such, first comparator 148 is adapted to identify overflow state 116 of first module 76 (FIG. 2).

First processed signal 82 is additionally input to a positive terminal of second comparator 150. Positive supply voltage 132, adjusted by resistors R3 and R4, to yield first lower threshold limit 136 (FIG. 3) is input to a negative terminal of second comparator 150. Second comparator 150 is configured to output a digital value in accordance with the following expressions:

$$V_A U = 0 \text{ if } V_A < \left[\frac{V_{UR}}{(R3 + R4)}\right] R4, \text{ or} \quad (7)$$

$$V_A U = 1 \text{ if } V_A > \left[\frac{V_{UR}}{(R3 + R4)}\right] R4 \quad (8)$$

Thus, second comparator 150 is configured to compare first processed signal 82 with first lower threshold limit 136, produce the first digital value (e.g., 1) as an underflow value 154, $V_A U$, at an output terminal of second comparator 150 when first processed signal 82 is greater than first lower threshold limit 136, or produce the second digital value (e.g., 0) as underflow value 154 when first processed signal 82 is less than first lower threshold limit 136. As such, second comparator 150 is adapted to identify underflow state 114 of first module 76 (FIG. 2).

Referring now to FIG. 5 in connection with FIG. 4, FIG. 5 shows a table 156 of possible outcomes from first fault detection circuit 88. The combination of digital values "1" and "0" for overflow and underflow values 152, 154 are summarized in table 156 to indicate each of acceptable state 112, underflow state 114, overflow state 116, and error state 118.

Overflow and underflow values 152, 154 are input to logic circuitry 158, 160, 162, 164 to identify one of acceptable state 112, underflow state 114, overflow state 116, and error state 118. Acceptable state 112 results when both of overflow and underflow values 152, 154 from first and second comparators 148, 150 is the digital value "1" in this example. Underflow state 114 results when overflow value 152 from first comparator 148 is the digital value "1" and underflow value 154 from second comparator 150 is the digital value "0" in this example. Note that an inverter of logic circuitry 160 implements logical negation of underflow value 154 such that when underflow value 154 is the digital value "0," the output of the inverter will be the digital value "1" and vice versa. An AND gate of logic circuitry 160 implements logical conjunction such that when overflow value 152 is the digital value "1" and the output of the inverter of logic circuitry 160 is the digital value "1," underflow state 114 can be identified.

Overflow state 116 results when overflow value 152 from first comparator 148 is the digital value "0" and underflow value 154 from second comparator 150 is the digital value "1" in this example. Note that an inverter of logic circuitry 162 implements logical negation of overflow value 152 such that when overflow value 152 is the digital value "0," the output of the inverter will be the digital value "1" and vice versa. An AND gate of logic circuitry 162 implements logical conjunction such that when underflow value 154 is the digital value "1" and the output of the inverter of logic circuitry 162 is the digital value "1," overflow state 116 can be identified.

Error state 118 results when overflow value 152 from first comparator 148 is the digital value "0" and underflow value 154 from second comparator 150 is also the digital value "0" in this example. Logic circuitry 164 includes a pair of inverters that implement logical negation of both of overflow and underflow values 152, 154 such that when both of overflow and underflow values 152, 154 are digital value "0," the output of the inverters will be the digital value "1" and vice versa. An AND gate of logic circuitry 164 implements logical conjunction such that when the output of both of the logical inverters is the digital value "1," error state 118 can be identified.

Error state 118 indicates that first and second comparators 148, 150 in first fault detection circuit 88 have failed, such that overflow values 152, 154 output from first and second comparators 148, 150, respectively, indicate that first processed signal 82 is both above first upper threshold limit 140 and simultaneously below first lower threshold limit 136. This condition is not possible when first and second comparators 148, 150 are operating correctly. However, this condition is possible if one or both of first and second comparators 148, 150 are faulted. Likewise, this condition is possible if a fault is present at the set of AND gates in logic circuitry 158, 160, 162, 164 that generate acceptable state 112, underflow state 114, overflow state 116, and error state 118.

Proper operations generate only one of the AND gates in logic circuitry 158, 160, 162, 164 producing "1" and the other three AND gates producing "0." However, a fault will cause all AND gates in logic circuitry 158, 160, 162, 164 to produce "0" or more than one AND gate to produce "1." Thus, first fault detection circuit 88 can include a diagnostic logic loop 166 to ascertain error state 118.

Referring now to FIG. 6, FIG. 6 shows a block diagram of second fault detection circuit 98 of measuring circuit 28 (FIG. 2). Second fault detection circuit 98 includes a third comparator 168 and a fourth comparator 170. Each of third and fourth comparators 168, 170 is powered by positive supply voltage 132 and negative supply voltage 134. In this example, negative supply voltage 134 is ground. However, in other embodiments, negative supply voltage 134 may be an actual negative value. Second processed signal 86 is input to a negative terminal of third comparator 168. Positive supply voltage 132, adjusted by resistors R5 and R6 to yield second upper threshold limit 142 (FIG. 3), is input to a positive terminal of third comparator 168. Third comparator 168 is configured output a digital value in accordance with the following expressions:

$$V_B O = 0 \text{ if } V_B > \left[\frac{V_{UR}}{(R5 + R6)}\right] R6, \text{ or} \tag{9}$$

$$V_B O = 1 \text{ if } V_B < \left[\frac{V_{UR}}{(R5 + R6)}\right] R6 \tag{10}$$

Thus, third comparator 168 is configured to compare second processed signal 86 with second upper threshold limit 142, produce a first digital value (e.g., 1) as an overflow value 172, $V_B O$, at an output terminal of third comparator 168 when second processed signal 86 is less than second upper threshold limit 142, or produce a second digital value (e.g., 0) as overflow value 172 when second processed signal 86 is greater than second upper threshold limit 142. As such, third comparator 168 is adapted to identify overflow state 124 of second module 78 (FIG. 2).

Second processed signal 86 is additionally input to a positive terminal of fourth comparator 170. Positive supply voltage 132, adjusted by resistors R7 and R8, to yield second lower threshold limit 138 (FIG. 3) is input to a negative terminal of fourth comparator 170. Fourth comparator 170 is configured to output a digital value in accordance with the following expressions:

$$V_B U = 0 \text{ if } V_B < \left[\frac{V_{UR}}{(R7 + R8)}\right] R8, \text{ or} \tag{11}$$

$$V_B U = 1 \text{ if } V_B > \left[\frac{V_{UR}}{(R7 + R8)}\right] R8 \tag{12}$$

Thus, fourth comparator 170 is configured to compare second processed signal 86 with second lower threshold limit 138, produce the first digital value (e.g., 1) as an underflow value 174, $V_B U$, at an output terminal of fourth comparator 170 when second processed signal 86 is greater than second lower threshold limit 138, or produce the second digital value (e.g., 0) as underflow value 174 when second processed signal 86 is less than second lower threshold limit 138. As such, fourth comparator 170 is adapted to identify underflow state 122 of second module 78 (FIG. 2).

Referring now to FIG. 7 in connection with FIG. 6, FIG. 7 shows a table 176 of possible outcomes from second fault detection circuit 98. The combination of digital values "1" and "0" for overflow and underflow values 172, 174 are summarized in table 176 to indicate each of acceptable state 120, underflow state 122, overflow state 124, and error state 126.

Overflow and underflow values 172, 174 are input to logic circuitry 178, 180, 182, 164 to identify one of acceptable state 120, underflow state 122, overflow state 124, and error state 126. Acceptable state 120 results when both of overflow and underflow values 172, 174 from third and fourth comparators 168, 170 is the digital value "1" in this example. Underflow state 122 results when overflow value 172 from third comparator 168 is the digital value "1" and underflow value 174 from fourth comparator 170 is the digital value "0" in this example. Note that an inverter of logic circuitry 180 implements logical negation of underflow value 174 such that when underflow value 174 is the digital value "0," the output of the inverter will be the digital value "1" and vice versa. An AND gate of logic circuitry 180 implements logical conjunction such that when overflow value 172 is the digital value "1" and the output of the inverter of logic circuitry 180 is the digital value "1," underflow state 122 can be identified.

Overflow state 124 results when overflow value 172 from third comparator 168 is the digital value "0" and underflow value 174 from fourth comparator 170 is the digital value "1" in this example. Note that an inverter of logic circuitry 182 implements logical negation of overflow value 172 such that when overflow value 172 is the digital value "0," the output of the inverter will be the digital value "1" and vice versa. An AND gate of logic circuitry 182 implements logical conjunction such that when underflow value 174 is the digital value "1" and the output of the inverter of logic circuitry 182 is the digital value "1," overflow state 124 can be identified.

Error state 126 results when overflow value 172 from third comparator 168 is the digital value "0" and underflow value 174 from fourth comparator 170 is also the digital value "0" in this example. Logic circuitry 184 includes a pair of inverters that implement logical negation of both of overflow and underflow values 172, 174 such that when both of overflow and underflow values 172, 174 are digital value "0," the output of the inverters will be the digital value "1" and vice versa. An AND gate of logic circuitry 184 implements logical conjunction such that when the output of both of the logical inverters is the digital value "1," error state 126 can be identified.

Error state 126 indicates that third and fourth comparators 168, 170 in second fault detection circuit 98 have failed, such that overflow and underflow values 172, 174 output from third and fourth comparators 168, 170, respectively, indicate that second processed signal 86 is both above second upper threshold limit 142 and simultaneously below second lower threshold limit 138. This condition is not possible when third and fourth comparators 168, 170 are operating correctly. However, this condition is possible if one or both of third and fourth comparators 168, 170 are faulted. Likewise, this condition is possible if a fault is present at the set of AND gates in logic circuitry 178, 180, 182, 184 that generate acceptable state 120, underflow state 122, overflow state 124, and error state 126.

Proper operations generate only one of the AND gates in logic circuitry 178, 180, 182, 184 producing "1" and the other three AND gates producing "0." However, a fault may cause all AND gates in logic circuitry 178, 180, 182, 184 to produce "0" or more than one AND gate to produce "1." Thus, second fault detection circuit 98 can include a diagnostic logic loop 186 to ascertain error state 126.

Figure 8:
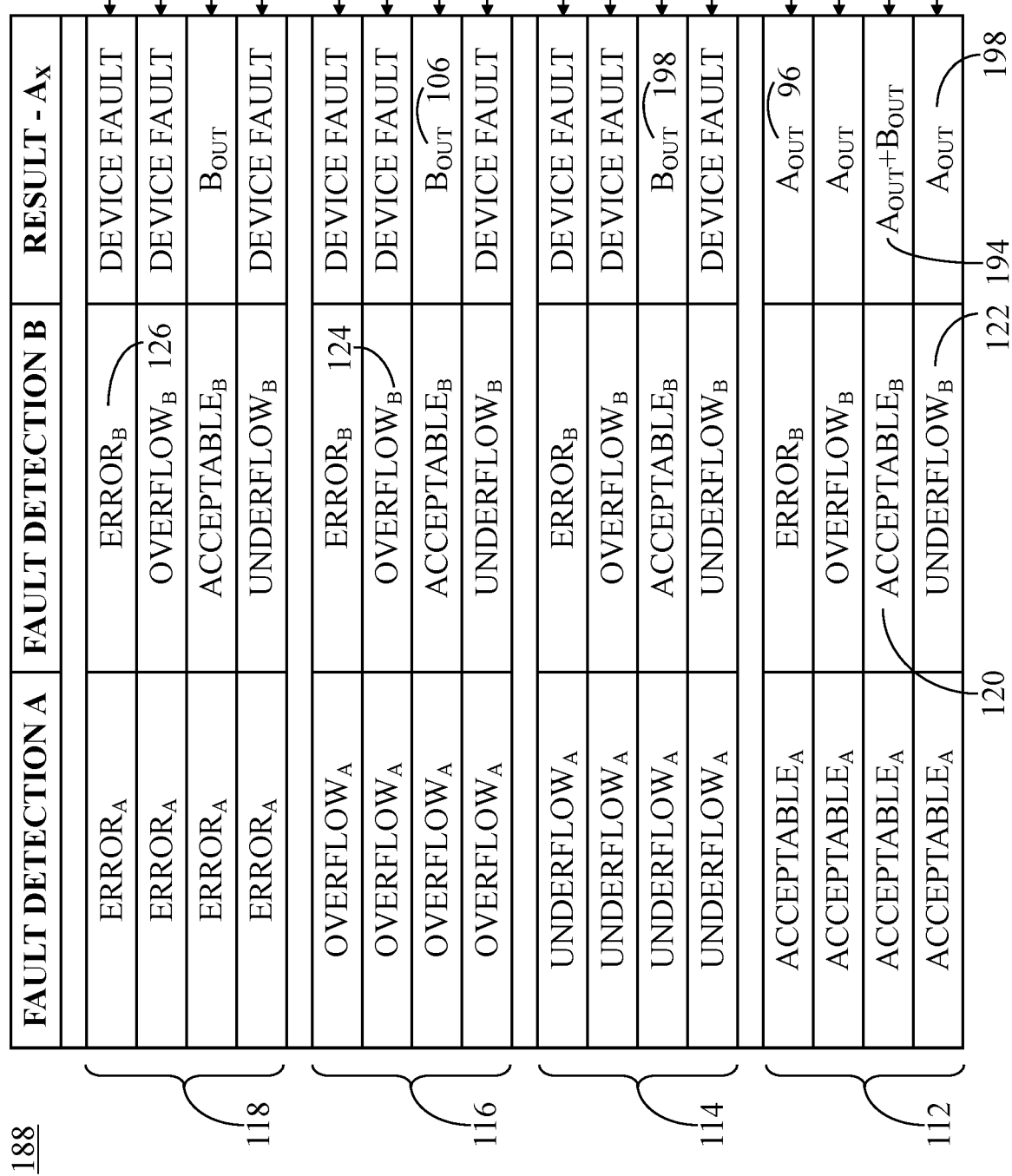
FIG. 8 shows a table of the combined outcomes of the tables of FIGS. 5 and 7.

FIG. 8 shows a table 188 of the combined outcomes of tables 156, 176 (FIGS. 5 and 7). As mentioned above, first fault detection circuit 88 (FIG. 4) is configured to determine from first processed signal 82 (FIG. 4) whether first module 76 (FIG. 2) is faulted. Additionally, first fault detection circuit 88 prevents output of first processed signal 82 when first module 76 is faulted and first fault detection circuit 88 enables output of first processed signal 82 when first module 76 is not faulted. Likewise, second fault detection circuit 98 (FIG. 6) is configured to determine from second processed signal 86 (FIG. 6) whether second module 78 (FIG. 2) is faulted. Additionally, second fault detection circuit 98 prevents output of second processed signal 86 when second module 78 is faulted and second fault detection circuit 98 enables output of second processed signal 86 when second module 78 is not faulted.

Acceptable states 112, 120 indicate nominal operation of the respective first and second modules 76, 78. Error states 118, 126 indicate a critical fault of the respective first and second modules 76, 78. Hence, the corresponding one of first and second modules 76, 78 in any of error states 118, 126 is identified as being faulted (e.g., ERROR$_n$, where n can be A or B in this example). Underflow states 114, 122 indicate at least a temporary fault of the respective first and second modules 76, 78 (e.g., UNDERFLOW$_n$, where n can be A or B in this example). Likewise, overflow states 116, 124 indicate at least a temporary fault of the respective first and second modules 76, 78 (e.g., OVERFLOW$_n$, where n can be A or B in this example). In underflow states 114, 122 and overflow states 116, 124, there is a potential for the afflicted one of first and second modules 76, 78 to recover as discussed above in connection with FIG. 3. Hence, the corresponding one of first and second modules 76, 78 in any underflow states 114, 122 or overflow states 116, 124 is identified as being at least temporarily faulted.

Signal processing unit 108 (FIG. 2) is configured to produce output signals (e.g., processed output signal 70, A$_x$) based upon the states of first and second modules 76, 78. As shown in table 188, a device fault condition 190 (DEVICE FAULT) exists when both of first and second modules 76, 78 are in respective error states 118, 126, when one of first and second modules 76, 78 is in its respective error state 118, 126, and the other of first and second modules 76, 78 is in its respective underflow state 114, 122 or overflow state 116, 124. Conversely, a nominal condition 192 exists when both of first and second modules 76, 78 are in respective acceptable states 112, 120. Thus, in nominal condition 192, signal processing unit 108 produces a first output signal 194 as a combination of processed digital output signals 96, 106 (generated from first and second processed signals 82, 86 FIG. 2).

A reduced functionality condition 196 exists when one of first and second modules 76, 78 is in error state 118, 126, underflow state 114, 122, or overflow state 116, 124, and the other of first and second modules 76, 78 is in acceptable state 112, 120. In reduced functionality condition 196, signal processing unit 108 produces a second output signal 198 as one of processed digital output signals 96, 106 (generated from first and second processed signals 82, 86 FIG. 2). Accordingly, sensor system 20 (FIG. 1) can remain operational in the event of a single point fault by reliance on the non-faulted one of modules 76, 78.

Figure 9:
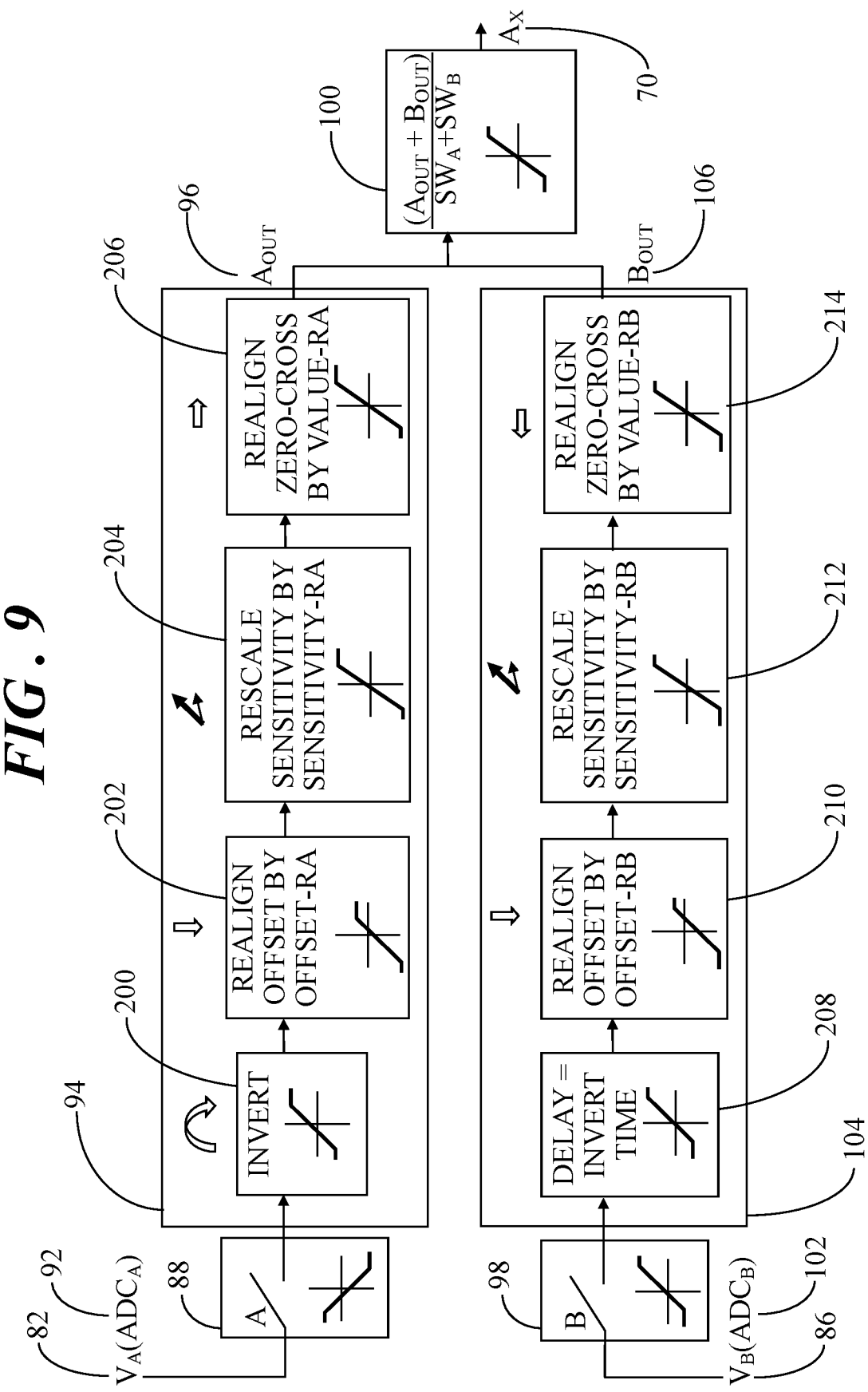
FIG. 9 shows a block diagram of first and second digital processing circuits of the measuring circuit of FIG. 2.

FIG. 9 shows a block diagram of first and second digital processing circuits 94, 104 of measuring circuit 28 (FIG. 2). First and second fault detection circuits 88, 98 are additionally represented in FIG. 9 by simple switches. First and second fault detection circuits 88, 98 allows the value-x (e.g., first processed signal 82 and/or second processed signal 86) to be input in respective first and second digital processing circuits 94, 104 depending upon the results of processing at first and second fault detection circuits 88, 98 as discussed above. A closed switch enables a corresponding one of first and second processed signals 82, 86 to be input into the corresponding one of first and second digital processing circuits 94, 104. Conversely, an open switch prevents a corresponding one of first and second processed signals 82, 86 to be input into the corresponding one of first and second digital processing circuits 94, 104.

First and second ADCs 80, 100 (FIG. 2) are not illustrated in FIG. 9 for simplicity. However, it should be understood that first processed signal 82 may be input to first digital processing circuit 94 as first digital data stream 92 (denoted in FIG. 9 within parentheses) for continued processing when the switch representing first fault detection circuit 88 is closed. Likewise, second processed signal 86 may be input to second digital processing circuit 104 as second digital data stream 102 (denoted in FIG. 9 within parentheses) for continued processing when the switch representing second fault detection circuit 98 is closed.

First digital processing circuit 94 includes an invert block 200. Due to the pair of redundant sensors (e.g., first and second sensors 30, 32 of FIG. 1) being opposite polarity, the sensor value (Value-A, e.g., first digital data stream 92) from first sensor 30 is inverted by multiplying the Sensitivity-A by a negative 1 and by subtracting the Offset-A from first upper threshold limit 140 (FIG. 3). Next, at a realign offset block 202, Offset-A may be re-centered to the ideal center of the range limit by adding an offset coefficient (Offset-RA). Next, at a rescale sensitivity block 204, Sensitivity-A may be re-centered to the value limit by multiplying by a sensitivity coefficient (Sensitivity-RA). At a realign zero-cross block 206, the sensor values for first module 76 may be re-centered to the data limit by adding a value coefficient (Value-RA). Following processing at blocks 200, 202, 204, 206, first processed digital output signal 96, $A_{OUT}$, can be output from first digital processing circuit 94. Hence, first processed digital output signal 96 may be represented by the following expression:

$$A_{OUT}=[(\text{Sensitivity-}A*\text{Sensitivity-}RA)*(\text{Value-}A+\text{Value-}RA)]+(\text{Offset-}A+\text{Offset-}RA) \quad (13)$$

Second digital processing circuit 104 includes a delay block 208. Due to the time required by the inversion occurring at invert block 200, sensor value (Value-B) from second module 78 (FIG. 2) is delayed at delay block 208 by the same amount of time as the inversion processing time of invert block 200. Thereafter, at a realign offset block 210, Offset-B may be re-centered to the ideal center of the range limit by adding an offset coefficient (Offset-RB). Next, at a rescale sensitivity block 212, Sensitivity-B may be re-centered to the value limit by multiplying by a sensitivity coefficient (Sensitivity-RB). At a realign zero-cross block 214, the sensor values from second module 78 may be re-centered to the data limit by adding a value coefficient (Value-RB). Following processing at blocks 208, 210, 212, 214, second processed digital output signal 106, $B_{OUT}$, can be output from first digital processing circuit 104. Hence, first processed digital output signal 96 may be represented by the following expression:

$$B_{OUT}=[(\text{Sensitivity-}B*\text{Sensitivity-}RB)*(\text{Value-}B+\text{Value-}RB)]+(\text{Offset-}B+\text{Offset-}RB) \quad (14)$$

First and second processed digital output signals 96, 106 are output from respective first and second digital processing circuits 96, 106 and combined at signal processing unit 108. Signal processing unit 108 generates the transposed and combined Value-T. The following expressions represent the generation of the transposed and combined Value-T:

$$\text{Value-}T=(A_{OUT}+B_{OUT})/(SW_A+SW_B) \quad (15)$$

When the switch representing first fault detection circuit 88 is open, thereby indicating a detected fault state (e.g., error state 118, overflow state 116, or underflow state 114, FIG. 4), the switch value ($SW_A$) will be 0 to block first processed signal 82 from being processed at first digital processing circuit 94. Hence, first processed digital output signal 96, $A_{OUT}$, will be forced to 0. When the switch representing first fault detection circuit 88 is closed, thereby indicating a non-faulted state (e.g., acceptable state 112, FIG. 4), the switch value ($SW_A$) will be 1 to allow first processed signal 82 to be processed at first digital processing circuit 94. Likewise, when the switch representing second fault detection circuit 98 is open, thereby indicating a detected fault state (e.g., error state 126, overflow state 124, or underflow state 122, FIG. 6), the switch value ($SW_B$) will be 0 to block second processed signal 86 from being processed at second digital processing circuit 104. Hence, second processed digital output signal 106, $B_{OUT}$, will be forced to 0. When the switch representing second fault detection circuit 98 is closed, thereby indicating a non-faulted state (e.g., acceptable state 120, FIG. 6), the switch value ($SW_B$) will be 1 to allow second processed signal 86 to be processed at second digital processing circuit 104.

Note that a condition in which both of the switch values ($SW_A$ and $SW_B$) are 0 (e.g., open), will result in a mathematical fault of expression (15). Accordingly, $A_{OUT}$ and $B_{OUT}$ can be forced to 0 as well to prevent a "divide by 0" fault. Such a mechanism informs an upstream user that the system (e.g., sensor system 20, FIG. 1) is critically faulted by providing a 0-valued output. Alternative mechanisms may entail driving the output maximum value, raising a fault flag, checking that the difference between $A_{OUT}$ and $B_{OUT}$ is sufficiently small, or any other mechanism for signaling a critical fault.

The transposed and combined result, Value-T, may be assigned a fixed and common set of coefficients (e.g., Sensitivity-T and Offset-T) that may be used to convert data into engineering units to obtain a Result-T in accordance with the following expression.

$$\text{Result-}T=(\text{Sensitivity-}T*\text{Value-}T)+\text{Offset-}T. \quad (16)$$

In the example presented above, Result-T may be processed output signal 70, $A_X$ (linear acceleration in meters/second$^2$). In other configurations, the Result-T may be angular rate in degrees/second, angular acceleration in degrees/second$^2$, pressure in Pascal, linear rate in meters/second, and so forth in accordance with the particular sensor architecture. First and second digital processing circuits 94, 104 are shown as being generally identical. However, for embodiments in which the sensors have differing sensing architectures (e.g., one is a capacitive transducer and another is a piezo resistive transducer), first and second digital processing circuits 94, 104 may not be identical.

Figure 10:
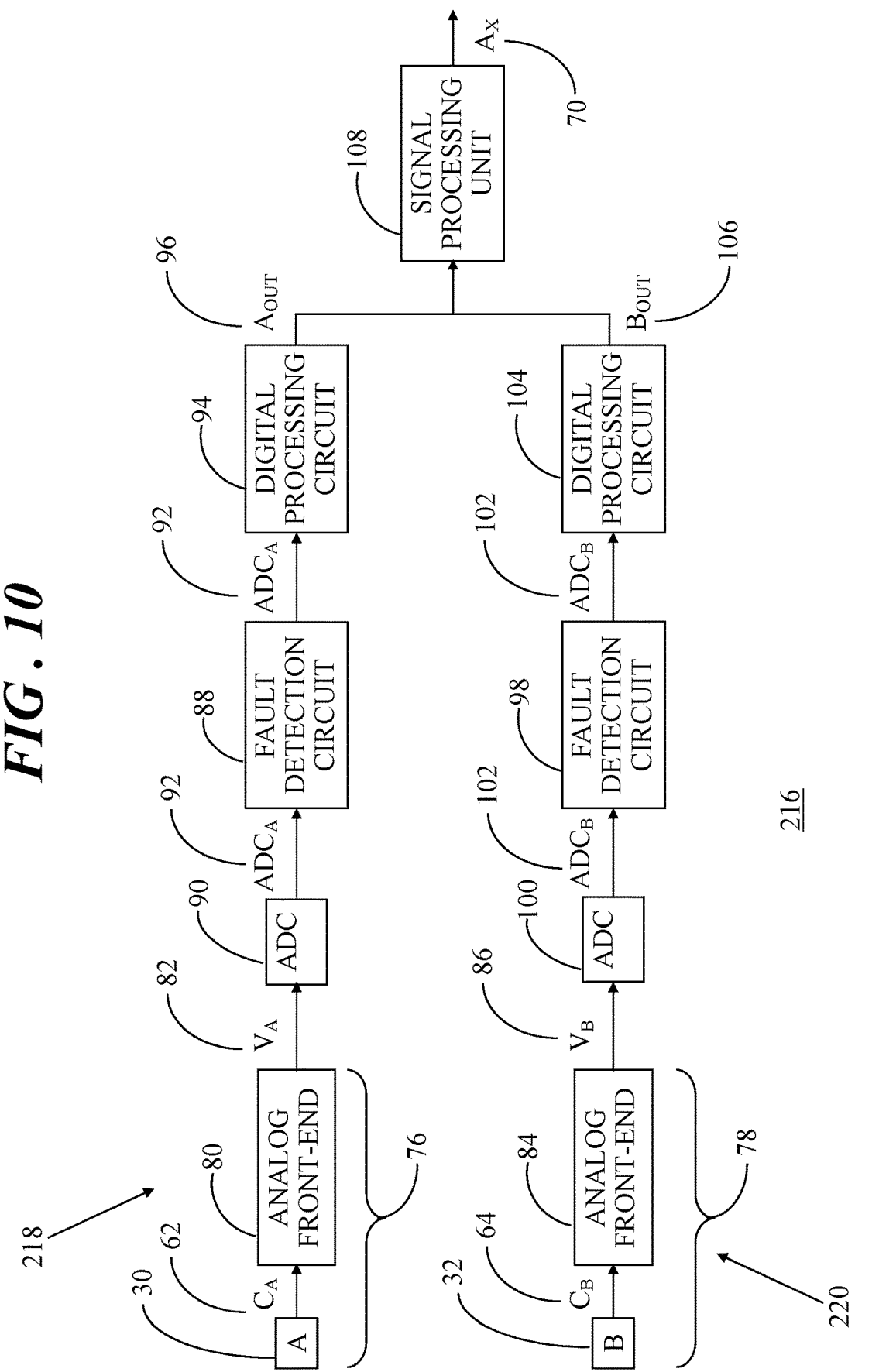
FIG. 10 shows a block diagram of a measuring circuit that may be implemented in the sensor system of FIG. 1 in accordance with an alternative embodiment.

FIG. 10 shows a block diagram of a measuring circuit 216 that may be implemented in sensor system 20 (FIG. 1) in accordance with an alternative embodiment. Measuring circuit 28 (FIG. 2) implements an embodiment in which first and second fault detection circuits 88, 98 provide fault detection in the signal processing chain prior to the respective first and second processed signals 82, 86 being digitized at respective first and second ADCs 90, 100. In the alternative embodiment of FIG. 10, fault detection occurs following digitization of first and second processed signals 82, 86. In measuring circuit 216, the same reference numbers will be utilized with similar elements of measuring circuit 28.

Accordingly, in measuring circuit 216, a first signal processing chain 218 is configured to process first sense signal 62 output from first sensor 30 and a second signal processing chain 220 is configured to process second sense signal 64 output from second sensor 32. In measuring circuit 216, first analog front-end circuit 80 of first module is again configured to receive first sense signal 62 and produce a first analog data stream (e.g., first processed signal 82, $V_A$) representative of first sense signal 62. Likewise, second analog front end 84 of second module 84 is again configured to receive second sense signal 64 and produce a second analog data stream (e.g., second processed signal 86, $V_B$) representative of second sense signal 64.

With reference to first signal processing chain 218, first ADC 90 has an input coupled with an output of first analog front-end circuit 80. First ADC 90 is configured to receive first processed signal 82 and convert first processed signal 82 into first digital data stream 92, $ADC_A$, indicative of first sense signal 62. An output of first ADC 90 is coupled to first fault detection circuit 88, and an output of first fault detection circuit 88 is selectively coupled to the input of first digital processing circuit 94. Now with reference to second signal processing chain 220, second ADC 100 has an input coupled with an output of second analog front-end circuit 84. Second ADC 100 is configured to receive second processed signal 86 and convert second processed signal 82 into second digital data stream 102, $ADC_B$, indicative of second sense signal 64. An output of second DC 100 is coupled to second fault detection circuit 98, and an output of second fault detection circuit 98 is selectively coupled to the input of second digital processing circuit 104.

Signal processing unit 108 is electrically coupled to each of first and second fault detection circuits 88, 98 via respective first and second signal processing chains 218, 220. As discussed previously, signal processing unit 108 is configured to produce a first output signal (e.g., first output signal 194, FIG. 8) as processed output signal 70 when both of first and second processed signals 82, 86 (in the form of first and second processed digital output signals 96, 106) are received, the first output signal being a combination of first and second processed signals 82, 86. Signal processing unit 108 is further configured to produce a second output signal (e.g., second output signal 198, FIG. 8) as processed output signal 70 when only one of first and second processed signals 82, 86 is received, the second output signal utilizing first processed signal 82 or second processed signal 86 from a non-faulted one of first and second modules 76, 78. Hence, processed output signal 70 may be a function of a combination of first and second processed signals 82, 86 when neither of first and second modules 76, 78 is faulted. Or processed output signal 70 may be a function of only one of first and second processed signals 82, 86 in the instance of a single point failure in which one of first and second modules 76, 78 is faulted. Still further, processed output signal 70 may not be produced at all in the instance of a critical failure of sensor system 20 (FIG. 1).

Figure 11:
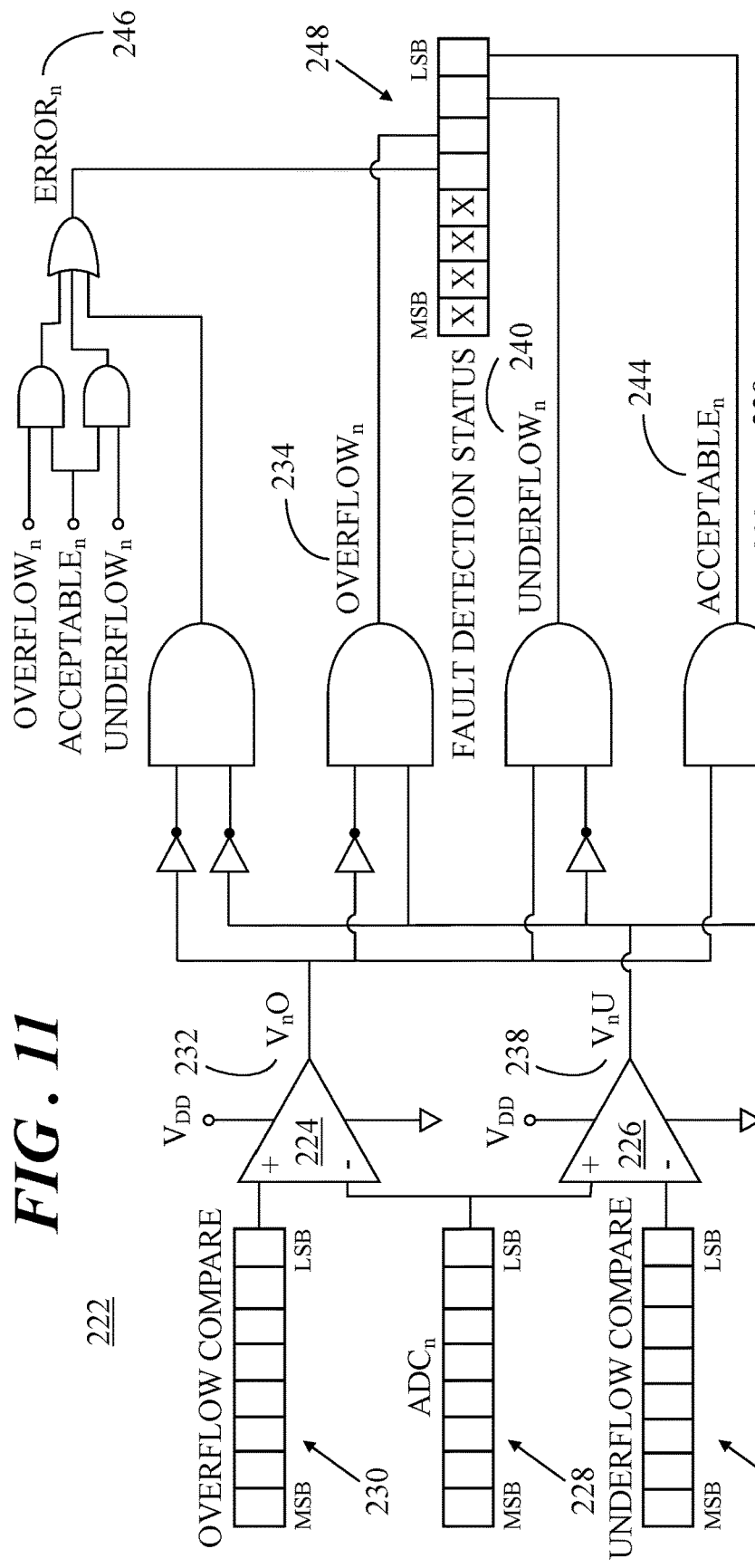
FIG. 11 shows a block diagram of a fault detection circuit that may be implemented in the measuring circuit of FIG. 10.

Referring to FIGS. 10 and 11, FIG. 11 shows a block diagram of a fault detection circuit 222 that may be implemented in measuring circuit 216. In the alternative embodiment of measuring circuit 216, first and second fault detection circuits 88, 98 may be incorporated following first and second ADCs 90, 100, respectively. Hence, first and second fault detection circuits 88, 98 are configured to receive corresponding first and second digital data streams (e.g., first digital data stream 92 and second digital data stream 102). Fault detection circuit 222 depicts the fault detection capability after analog-to-digital conversion using writable registers that could appear in the device memory map, along with the other sets of coefficients. Separate fault detection circuits 222 may be implemented for first and second fault detection circuits 88, 98 of measuring circuit 216. Thus, the subscript "n" is provided in FIG. 11 to represent either of "A" and "B" as presented previously.

Fault detection circuit 222 includes a first comparator 224 and a second comparator 226. First comparator 224 is configured to compare a value in an $ADC_n$ register 228 (e.g., first or second digital data stream 92, 102) to a value in an overflow compare register 230 (corresponding to an upper threshold limit, FIG. 3), produce the first digital value (e.g., 1) as an overflow value 232, $V_nO$, at an output terminal of first comparator 224 when the value in $ADC_n$ register 228 is less than the value in overflow compare register 230, or produce the second digital value (e.g., 0) as overflow value 232 when the value in $ADC_n$ register 228 is greater than the value in overflow compare register 230. As such, first comparator 224 is adapted to identify an overflow state 234 ($OVERFLOW_n$) of the corresponding module (e.g., first or second module 76, 78).

Second comparator 226 is configured to compare the value in $ADC_n$ register 228 (e.g., first or second digital data stream 92, 102) to a value in an underflow compare register 236 (corresponding to a lower threshold limit, FIG. 3), produce the first digital value (e.g., 1) as an underflow value 238, $V_nU$, at an output terminal of second comparator 226 when the value in $ADC_n$ register 228 is greater than the value in underflow compare register 236, or produce the second digital value (e.g., 0) as underflow value 238 when the value in $ADC_n$ register 228 is less than the value in underflow compare register 236. As such, second comparator 226 is adapted to identify an underflow state 240 ($UNDERFLOW_n$) of the corresponding module (e.g., first or second module 76, 78).

Logic circuitry 242 of fault detection circuit 222 operates similarly to the logic circuitry of FIGS. 4 and 6 to identify each of an acceptable state 244 ($ACCEPTABLE_n$), underflow state 240, overflow state 234, and an error state 246 ($ERROR_n$). Thus, the descriptions of the logic circuitry of FIGS. 4 and 6 applies equivalently to logic circuitry 242 and will not be repeated herein for brevity. An outcome of logic circuitry 242 is written to a fault detection status register 248. In this example, the outcome of logic circuitry 242 may be written to the four least significant bits (LSB) of fault detection status register 248. In other embodiments, the outcome of logic circuitry 242 may be written to any bits in any register.

Figure 12:
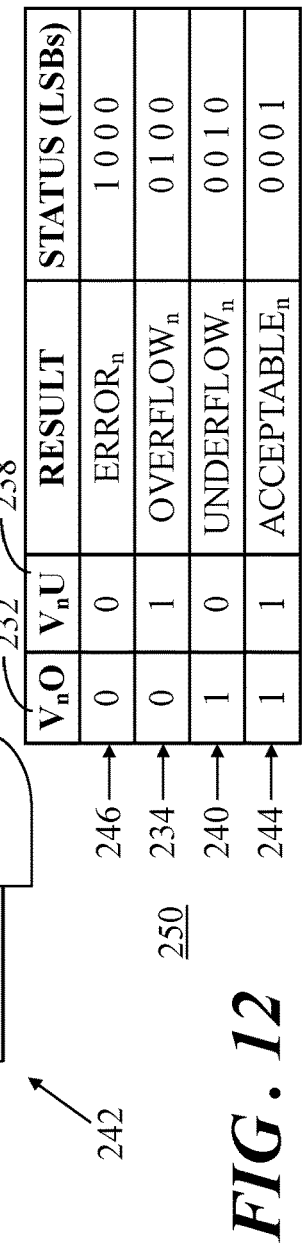
FIG. 12 shows a table of possible outcomes from the fault detection circuit of FIG. 10.

Referring now to FIG. 12 in connection with FIGS. 10 and 11, FIG. 12 shows a table 250 of possible outcomes from fault detection circuit 222. The combination of digital values "1" and "0" for overflow and underflow values 232, 238 are summarized in table 250 to indicate each of acceptable state 244, underflow state 240, overflow state 234, and error state 246. In this example, identification of each of acceptable state 244, underflow state 240, overflow state 234, and error state 246 is assigned to particular ones of the least significant bits of fault detection status register 248. The switches representing first and second fault detection circuits 88, 98 in FIG. 9 may then be controlled by each ACCEPTABLE$_n$ bit (e.g., 1=Switch$_n$ closed and 0=Switch$_n$ open).

Figure 13:
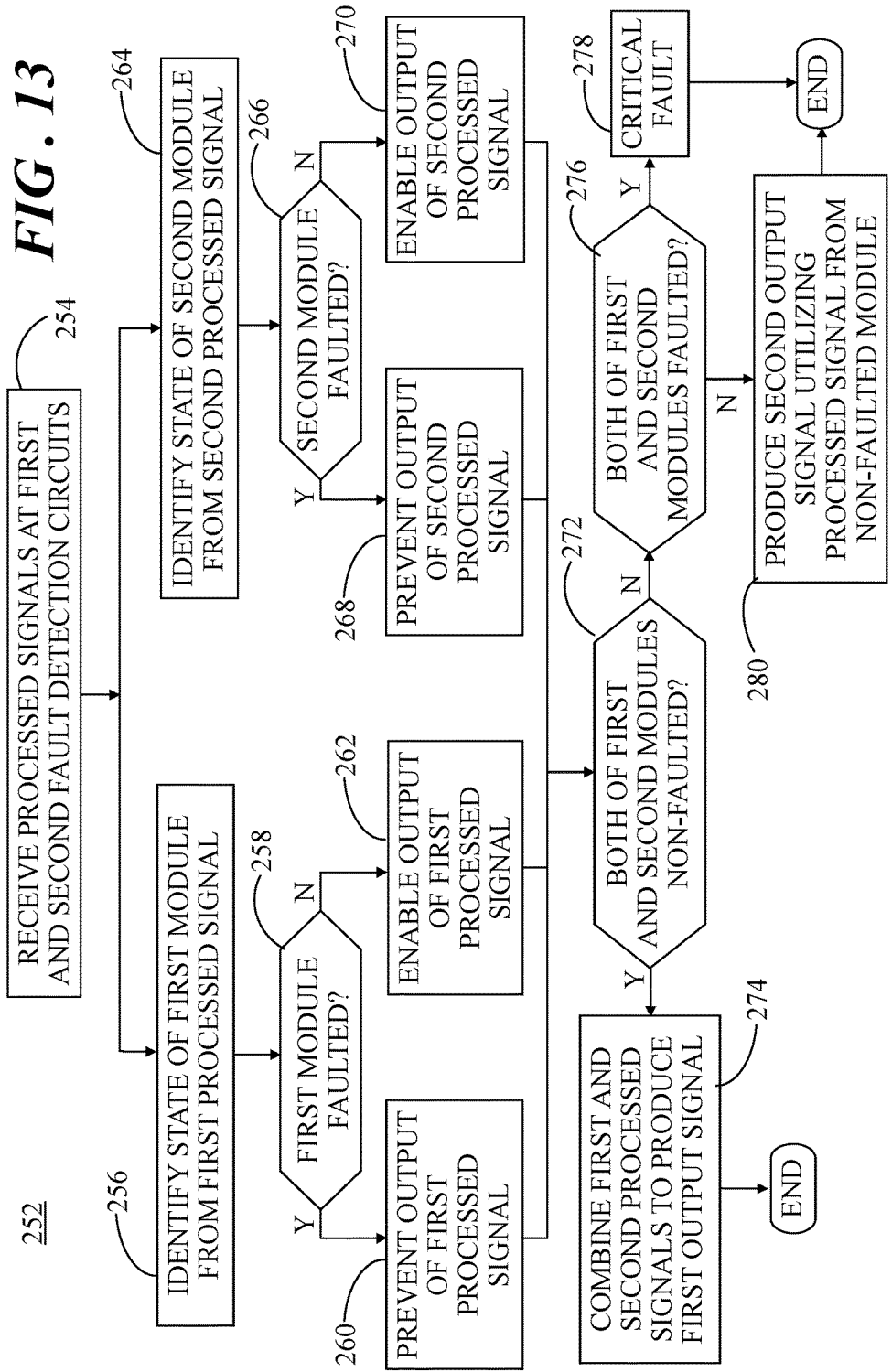
FIG. 13 shows a flowchart of process for testing independent sensor modules in a redundant sensor system.

FIG. 13 shows a flowchart of a process 252 for testing independent sensor modules (e.g., first and second modules 76, 78, FIG. 1) in a redundant sensor system (e.g., sensor system 20). For simplicity, process 252 is described in connection with measuring circuit 28 (FIG. 2) in which fault detection is performed prior to analog to digital conversion of processed signals 82, 86. Thus, reference can be made concurrently to FIG. 2 in connection with the following description. Process 252 may be performed autonomously during normal operation of sensor system 20 (FIG. 1).

At a block 254, first and second processed signals 82, 86 are received at respective first and second fault detection circuits 88, 98. Thereafter, parallel processing operations may occur. For example, at a block 256, first fault detection circuit 88 identifies the state of first module 76 from first processed signal 82. As discussed in detail in connection with FIGS. 4-5, the state of first module 76 may be any one of acceptable state 112, underflow state 114, overflow state 116, and error state 118. At a query block 258, a determination is made as to whether first module 76 is faulted (e.g., any of underflow state 114, overflow state 116, and error state 118 is identified at block 256). When a determination is made at query block 258 that first module 76 is faulted, process control proceeds to a block 260. At block 260, first fault detection circuit 88 prevents output of first processed signal 82. Conversely, when a determination is made at query block 258 that first module 76 is not faulted (e.g., acceptable state 112 is identified at block 256), process control proceeds to a block 262. At block 262, first fault detection circuit 88 enables output of first processed signal 82.

On a parallel processing track with blocks 256, 258, 260, 262 of process 252, at block 264, second fault detection circuit 98 identifies the state of second module 78 from second processed signal 84. As discussed in detail in connection with FIGS. 6 and 7, the state of second module 78 may be any one of acceptable state 120, underflow state 122, overflow state 124, and error state 126. At a query block 266, a determination is made as to whether second module 78 is faulted (e.g., any of underflow state 122, overflow state 124, and error state 126 is identified at block 264). When a determination is made at query block 266 that second module 78 is faulted, process control proceeds to a block 268. At block 268, second fault detection circuit 98 prevents output of second processed signal 86. Conversely, when a determination is made at query block 266 that second module 78 is not faulted (e.g., acceptable state 120 is identified at block 264), process control proceeds to a block 270. At block 270, second fault detection circuit 98 enables output of second processed signal 82.

A query block 272 follows all of blocks 260, 262, 268, 270. At query block 272 a determination is made as to whether both of first and second modules 76, 78 are non-faulted. A determination is made at query block 272 that both of first and second modules 76, 78 are non-faulted when first and second fault detection circuits 88, 98 enable output of respective first and second processed signals 82, 86 at the preceding blocks 262, 270. When first and second modules 76, 78 are determined to be non-faulted at query block 272, process control continues at a block 274. At block 274, first and second processed signals 82, 86 are suitably combined as discussed above to produce first output signal 192 (FIG. 8), which is thereafter output from sensor system 20 as processed output signal 70. In response to execution of block 274, a single iteration of process 252 ends. However, it should be understood that execution of process 252 can continue whenever sensor system 20 is energized and processed signals are received at block 254 in order to continuously monitor for faults.

Conversely, when a determination is made at query block 272 that at least one of first and second modules 76, 78 is determined to be faulted, process control continues with a query block 276. At query block 276, a determination is made as to whether both of first and second modules 76, 78 is faulted. A condition in which both of first and second modules 76, 78 is faulted can be identified by the preceding blocks 260 and 268 when, for example, output of first processed signal 82 from first module 76 is prevented and concurrently output of second processed signal 86 from second module 78 is prevented. Thus, first module 76 is in one of underflow, overflow, and error states 114, 116, 118, and second module 78 is in one of underflow, overflow, and error states 122, 124, 126), process 254 may end. Process control continues with a block 278 when a determination is made at query block 276 that both of first and second modules 76, 78 are faulted. At block 278, a downstream application or control system may be informed that a critical fault may have been detected. Process 254 is shown as ending following block 280 during a single iteration of process 254 for simplicity. However, it should be understood that execution of process 252 can continue. For example, process 252 may be repeated in the instance that one or both of first and second modules 76, 78 is in their respective overflow or underflow state and may recover.

A determination can alternatively be made at query block 276 that both of first and second modules 76, 78 are not faulted (e.g., one of first and second modules 76, 78 is not faulted). A condition in which only one of first and second modules 76, 78 is not faulted can be identified by the preceding blocks 260, 262, 268, 270 when, for example, first module 76 is in acceptable state 112 and second module 78 is in one of underflow, overflow, and error states 122, 124, 126. In another example, second module 78 may be in acceptable state 120 and first module 76 may be in one of underflow, overflow, and error states 114, 116, 118. When a determination is made at query block 276 that both of first and second modules 76, 78 are not faulted (e.g., only one of first and second modules 76, 78 is faulted), process control continues with a block 280. At block 280, second output signal 196 (FIG. 8) is produced utilizing one of first and second processed signals 82, 86 from the non-faulted one of first and second modules 76, 78 and is thereafter output from sensor system 20 as processed output signal 70. Accordingly, a reduced functionality mode of sensor system 20 may be implemented in which only the information output from the non-faulted module may be utilized. In response to execution of block 280, a single iteration of process 252 ends. However, it should be understood that execution of process 252 may be repeated whenever sensor system 20 is energized and processed signals are received at block 254 in order to continuously monitor for faults and/or to enable recovery of the faulted module when it is one of the overflow or underflow states.

It is to be understood that certain ones of the process blocks depicted in FIG. 13 may be performed in parallel with each other or with performing other processes. In addition, it is to be understood that the particular ordering of the process blocks depicted in FIG. 13 may be modified, while achieving substantially the same result. Accordingly, such modifications are intended to be included within the scope of the inventive subject matter.

Thus, a redundant sensor system and methodology for fault detection and mitigation of faults within the redundant sensor system is disclosed herein. An embodiment of sensor system comprises a first module including a first sensor configured to produce a first sense signal in response to a physical stimulus and a first processing circuit configured to receive the first sense signal and produce a first processed signal representative of the first sense signal. A first fault detection circuit is electrically coupled with the first module, the first fault detection circuit being configured to determine from the first processed signal whether the first module is faulted, wherein the first fault detection circuit prevents output of the first processed signal when the first module is faulted and the first fault detection circuit enables output of the first processed signal when the first module is not faulted. A second module includes a second sensor configured to produce a second sense signal in response to the physical stimulus and a second processing circuit configured to receive the second sense signal and produce a second processed signal representative of the second sense signal. A second fault detection circuit is electrically coupled with the second module, the second fault detection circuit being configured to determine from the second processed signal whether the second module is faulted, wherein the second fault detection circuit prevents output of the second processed signal when the second module is faulted and the second fault detection circuit enables output of the second processed signal when the second module is not faulted. A signal processing unit is electrically coupled to each of the first and second fault detection circuits and is configured to produce a first output signal when both of the first and second processed signals are received, the first output signal being a combination of the first and second processed signals, and the signal processing unit being further configured produce a second output signal when only one of the first and second output signals is received, the second output signal utilizing the first processed signal or the second processed signal from a non-faulted one of the first and second modules.

An embodiment of method for testing a sensor system having independent first and second modules, the first module including a first sensor configured to produce a first sense signal in response to a physical stimulus and a first processing circuit configured to receive the first sense signal and produce a first processed signal representative of the first sense signal, the second module a second sensor configured to produce a second sense signal in response to the physical stimulus and a second processing circuit configured to receive the second sense signal and produce a second processed signal representative of the second sense signal, wherein the method comprises determining from the first processed signal whether the first module is faulted, determining from the second processed signal whether the second module is faulted, combining the first and second processed signals to produce a first output signal when neither of the first of the first and second modules is faulted, and producing a second output signal by utilizing only the first processed signal or the second processed signal from a non-faulted one of the first and second modules when the other of the first and second modules is faulted.

Another embodiment of a sensor system comprises a first module including a first sensor configured to produce a first sense signal in response to a physical stimulus and a first processing circuit configured to receive the first sense signal and produce a first processed signal representative of the first sense signal. A first fault detection circuit is electrically coupled with the first module, the first fault detection circuit being configured determine from the first processed signal whether the first module is faulted, wherein the first fault detection circuit prevents output of the first processed signal when the first module is faulted and the first fault detection circuit enables output of the first processed signal when the first module is not faulted. A second module includes a second sensor configured to produce a second sense signal in response to the physical stimulus and a second processing circuit configured to receive the second sense signal and produce a second processed signal representative of the second sense signal, wherein the first and second sensors are redundant sensors configured to detect the same physical stimulus and the first and second processing circuits include duplicate circuitry. A second fault detection circuit is electrically coupled with the second module, the second fault detection circuit being configured to determine from the second processed signal whether the second module is faulted, wherein the second fault detection circuit prevents output of the second processed signal when the second module is faulted and the second fault detection circuit enables output of the second processed signal when the second module is not faulted. A signal processing unit is electrically coupled to each of the first and second fault detection circuits and is configured to produce a first output signal when both of the first and second processed signals are received, the first output signal being a combination of the first and second processed signals, and the signal processing unit being further configured to produce a second output signal when only one of the first and second output signals is received, the second output signal utilizing the first processed signal or the second processed signal from a non-faulted one of the first and second modules.

Accordingly, a sensor system having redundant modules (each module including a sensor and a front-end signal processing chain configured to sense the same physical stimulus) includes an independent fault detection circuit associated with each module. Each fault detection circuit is configured to determine whether the corresponding module is faulted or non-faulted. The fault detection circuit prevents output of signals from the module when the module is faulted and enables output of signals from the module when the module is not faulted. In the instance of a single point failure, the system and methodology can enable a reduced functionality mode of the sensor system. The fault detection methodology may function autonomously to detect the failure of one of the modules and mitigate it dynamically to isolate the faulted module and produce a processed digital output signal indicative of the output from the non-faulted module. Thus, the methodology may be implemented in a variety of redundant sensor systems in which the functionality of a redundant sensor system may be determined, and failure mitigation may be performed.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A sensor system comprising:
   a first module including a first sensor configured to produce a first sense signal in response to a physical stimulus and a first processing circuit configured to receive the first sense signal and produce a first processed signal representative of the first sense signal, wherein a first analog-to-digital converter (ADC) is electrically coupled to the first processing circuit and is configured to convert the first sense signal into the first processed signal;
   a first fault detection circuit electrically coupled with the first module, the first fault detection circuit being configured to determine from the first processed signal whether the first module is faulted, wherein the first fault detection circuit prevents output of the first processed signal when the first module is faulted and the first fault detection circuit enables output of the first processed signal when the first module is not faulted, wherein the first processed signal is a first digital data stream that is received at the first fault detection circuit;
   a second module including a second sensor configured to produce a second sense signal in response to the physical stimulus and a second processing circuit configured to receive the second sense signal and produce a second processed signal representative of the second sense signal, wherein a second ADC is electrically coupled to the second processing circuit and is configured to convert the second sense signal into the second processed signal;
   a second fault detection circuit electrically coupled with the second module, the second fault detection circuit being configured to determine from the second processed signal whether the second module is faulted, wherein the second fault detection circuit prevents output of the second processed signal when the second module is faulted and the second fault detection circuit enables output of the second processed signal when the second module is not faulted, wherein the second processed signal is a second digital data stream that is received at the second fault detection circuit; and
   a signal processing unit electrically coupled to each of the first and second fault detection circuits and configured to produce a first output signal when both of the first and second processed signals are received, the first output signal being a combination of the first and second processed signals, and the signal processing unit being further configured produce a second output signal when only one of the first and second processed signals is received, the second output signal utilizing the first processed signal or the second processed signal from a non-faulted one of the first and second modules.

2. The sensor system of claim 1 wherein the first and second sensors are configured to detect the same physical stimulus.

3. The sensor system of claim 1 wherein the first and second processing circuits include duplicate circuitry.

4. The sensor system of claim 1 wherein:
   the first processing circuit includes first analog front-end circuitry configured to produce the first processed signal as a first analog data stream that is received at the first fault detection circuit; and
   the second processing circuit includes second analog front-end circuitry configured to produce the second processed signal as a second analog data stream that is received at the second fault detection circuit.

5. The sensor system of claim 1 wherein each of the first and second fault detection circuits is configured to identify one of a plurality of possible states of a corresponding one of the first and second modules in response to the corresponding one of the first and second processed signals, the plurality of possible states including a non-faulted state, an underflow state, an overflow state, and an error state.

6. A sensor system comprising:
   a first module including a first sensor configured to produce a first sense signal in response to a physical stimulus and a first processing circuit configured to receive the first sense signal and produce a first processed signal representative of the first sense signal;
   a first fault detection circuit electrically coupled with the first module, the first fault detection circuit being configured to determine from the first processed signal whether the first module is faulted, wherein the first fault detection circuit prevents output of the first processed signal when the first module is faulted and the first fault detection circuit enables output of the first processed signal when the first module is not faulted;
   a second module including a second sensor configured to produce a second sense signal in response to the physical stimulus and a second processing circuit configured to receive the second sense signal and produce a second processed signal representative of the second sense signal;
   a second fault detection circuit electrically coupled with the second module, the second fault detection circuit being configured to determine from the second processed signal whether the second module is faulted, wherein the second fault detection circuit prevents output of the second processed signal when the second module is faulted and the second fault detection circuit enables output of the second processed signal when the second module is not faulted, wherein each of the first and second fault detection circuits is configured to identify one of a plurality of possible states of a corresponding one of the first and second modules in response to the corresponding one of the first and second processed signals, the plurality of possible states including a non-faulted state, an underflow state, an overflow state, and an error state; and
   a signal processing unit electrically coupled to each of the first and second fault detection circuits and configured to produce a first output signal when both of the first and second processed signals are received, the first output signal being a combination of the first and second processed signals, and the signal processing unit being further configured produce a second output signal when only one of the first and second processed signals is received, the second output signal utilizing the first processed signal or the second processed signal from a non-faulted one of the first and second modules, wherein:
     when the non-faulted state is identified, the corresponding one of the first and second fault detection circuits enables output of the corresponding one of the first and second processed signals;
     when the error state is identified, the corresponding one of the first and second fault detection circuits prevents output of the corresponding one of the first and second processed signals; and
     when either of the underflow and overflow states is identified, the corresponding one of the first and second fault detection circuits at least temporarily prevents output of the corresponding one of the first and second processed signals.

7. A sensor system comprising:
a first module including a first sensor configured to produce a first sense signal in response to a physical stimulus and a first processing circuit configured to receive the first sense signal and produce a first processed signal representative of the first sense signal;
a first fault detection circuit electrically coupled with the first module, the first fault detection circuit being configured to determine from the first processed signal whether the first module is faulted, wherein the first fault detection circuit prevents output of the first processed signal when the first module is faulted and the first fault detection circuit enables output of the first processed signal when the first module is not faulted, the first fault detection circuit comprising:
 a first comparator configured to compare the first processed signal with a first upper threshold limit, produce a first digital value when the first processed signal is less than the first upper threshold limit, and produce a second digital value when the first processed signal is greater than the first upper threshold limit; and
 a second comparator configured to compare the first processed signal with a first lower threshold limit, produce the first digital value when the first processed signal is greater than the first lower threshold limit, and produce the second digital value when the first processed signal is less than the first lower threshold limit; and
a second module including a second sensor configured to produce a second sense signal in response to the physical stimulus and a second processing circuit configured to receive the second sense signal and produce a second processed signal representative of the second sense signal;
a second fault detection circuit electrically coupled with the second module, the second fault detection circuit being configured to determine from the second processed signal whether the second module is faulted, wherein the second fault detection circuit prevents output of the second processed signal when the second module is faulted and the second fault detection circuit enables output of the second processed signal when the second module is not faulted; the second fault detection circuit comprising:
 a third comparator configured to compare the second processed signal with a second upper threshold limit, produce the first digital value when the second processed signal is less than the second upper threshold limit, and produce the second digital value when the second processed signal is greater than the second upper threshold limit; and
 a fourth comparator configured to compare the second processed signal with a second lower threshold limit, produce the first digital value when the second processed signal is greater than the second lower threshold limit, and produce the second digital value when the second processed signal is less than the second lower threshold limit; and
a signal processing unit electrically coupled to each of the first and second fault detection circuits and configured to produce a first output signal when both of the first and second processed signals are received, the first output signal being a combination of the first and second processed signals, and the signal processing unit being further configured produce a second output signal when only one of the first and second processed signals is received, the second output signal utilizing the first processed signal or the second processed signal from a non-faulted one of the first and second modules.

8. The sensor system of claim 7 wherein:
the second upper threshold limit differs from the first upper threshold limit; and
the second lower threshold limit differs from the first lower threshold limit.

9. The sensor system of claim 7 wherein:
the first fault detection circuit is configured to identify a non-faulted state of the first module when both of the first and second comparators produce the first digital value, identify an underflow state of the first module when the first comparator produces the first digital value and the second comparator produces the second digital value, identify an overflow state of the first module when the first comparator produces the second digital value and the second comparator produces the first digital value, identify an error state of the first module when both of the first and second comparators produce the second digital value, and only enable output of the first processed signal when the non-faulted state is identified; and
the second fault detection circuit is configured to identify a non-faulted state of the second module when both of the third and fourth comparators produce the first digital value, identify an underflow state of the second module when the third comparator produces the first digital value and the fourth comparator produces the second digital value, identify an overflow state of the second module when the third comparator produces the second digital value and the fourth comparator produces the first digital value, identify an error state of the second module when both of the third and fourth comparators produce the second digital value, and only enable output of the second processed signal when the non-faulted state is identified.

10. A method for testing a sensor system having independent first and second modules, the first module including a first sensor configured to produce a first sense signal in response to a physical stimulus and a first processing circuit configured to receive the first sense signal and produce a first processed signal representative of the first sense signal, the second module including a second sensor configured to produce a second sense signal in response to the physical stimulus and a second processing circuit configured to receive the second sense signal and produce a second processed signal representative of the second sense signal, and the method comprising:
 determining from the first processed signal whether the first module is faulted, wherein the determining from the first processed signal whether the first module is faulted comprises identifying one of a plurality of possible states of the first module in response to the first processed signal, the plurality of possible states including a non-faulted state, an underflow state, an overflow state, and an error state;
 determining from the second processed signal whether the second module is faulted, wherein the determining from the second processed signal whether the second module is faulted comprises identifying one of the plurality of possible states of the second module in response to the second processed signal;

combining the first and second processed signals to produce a first output signal when neither of the first of the first and second modules is faulted, wherein the combining operation is performed in response to identifying that both of the first and second modules is in the non-faulted state;

producing a second output signal by utilizing only the first processed signal or the second processed signal from a non-faulted one of the first and second modules when the other of the first and second modules is faulted, wherein the producing operation is performed when one of the first and second modules is in the underflow state, the overflow state, and the error state; and following the performing the producing operation when one of the first and second modules is in the underflow state or the overflow state, the method further comprises:

ascertaining that the one of the first and second modules has returned to the non-faulted state; and performing the combining operation in response to ascertaining that the one of the first and second modules has returned to the non-faulted state.

11. The method of claim 10 wherein:

the first and second sensors are configured to detect the same physical stimulus; and the first and second processing circuits include duplicate circuitry.

12. The method of claim 10 wherein the determining from the first processed signal whether the first module is faulted is performed at a first fault detection circuit, the determining from the second processed signal whether the second module is faulted is performed at a second fault detection circuit, the combining and producing operations are performed at a signal processing unit in electrical communication with each of the first and second fault detection circuits, and the method further comprises:

at the first fault detection circuit, preventing output of the first processed signal when the first module is faulted and enabling output of the first processed signal to the signal processing unit when the first module is not faulted; and at the second fault detection circuit, preventing output of the second processed signal when the second module is faulted and enabling output of the second processed signal to the signal processing unit when the second module is not faulted.

13. A method for testing a sensor system having independent first and second modules, the first module including a first sensor configured to produce a first sense signal in response to a physical stimulus and a first processing circuit configured to receive the first sense signal and produce a first processed signal representative of the first sense signal, the second module including a second sensor configured to produce a second sense signal in response to the physical stimulus and a second processing circuit configured to receive the second sense signal and produce a second processed signal representative of the second sense signal, and the method comprising:

determining from the first processed signal whether the first module is faulted, wherein the determining from the first processed signal whether the first module is faulted comprises:

comparing the first processed signal with a first upper threshold limit;

comparing the first processed signal with a first lower threshold limit;

identifying a non-faulted state of the first module when the first processed signal is within the first upper and lower threshold limits; and identifying one of an underflow state, an overflow state, and an error state of the first module when the first processed signal is outside of at least one of the first upper and lower threshold limits, wherein the underflow state, the overflow state, and the error state indicates the first module is at least temporarily faulted; and determining from the second processed signal whether the second module is faulted, wherein the determining from the second processed signal whether the second module is faulted comprises:

comparing the second processed signal with a second upper threshold limit;

comparing the second processed signal with a second lower threshold limit;

identifying the non-faulted state of the second module when the second processed signal is within the second upper and lower threshold limits; and identifying one of the underflow state, the overflow state, and the error state when the second processed signal is outside of at least one of the second upper and lower threshold limits, wherein the underflow state, the overflow state, and the error state indicates the second module is at least temporarily faulted.

14. The method of claim 13 further comprising:

configuring the first and second upper threshold limits to differ from one another; and configuring the first and second lower threshold limits to differ from one another.

* * * * *